United States Patent
Watanabe et al.

(10) Patent No.: US 10,668,557 B2
(45) Date of Patent: Jun. 2, 2020

(54) SPOT WELDING ELECTRODE AND WELDING APPARATUS AND WELDING METHOD USING SAME

(71) Applicant: NIPPON STEEL & SUMITOMO METAL CORPORATION, Tokyo (JP)

(72) Inventors: Fuminori Watanabe, Tokyo (JP); Tohru Okada, Tokyo (JP); Seiji Furusako, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 863 days.

(21) Appl. No.: 15/029,187

(22) PCT Filed: Dec. 5, 2014

(86) PCT No.: PCT/JP2014/082314
§ 371 (c)(1),
(2) Date: Apr. 13, 2016

(87) PCT Pub. No.: WO2015/083835
PCT Pub. Date: Jun. 11, 2015

(65) Prior Publication Data
US 2016/0271721 A1    Sep. 22, 2016

(30) Foreign Application Priority Data

Dec. 6, 2013  (JP) ................. 2013-253218

(51) Int. Cl.
*B23K 11/30* (2006.01)
*B23K 11/11* (2006.01)
(Continued)

(52) U.S. Cl.
CPC ......... *B23K 11/3009* (2013.01); *B23K 11/115* (2013.01); *B23K 11/16* (2013.01);
(Continued)

(58) Field of Classification Search
CPC ... B23K 11/115; B23K 11/16; B23K 11/3009; B23K 2101/18; B23K 3/087; B23K 5/24; B23K 7/102; B23K 11/364; B23K 11/368
(Continued)

(56) References Cited

U.S. PATENT DOCUMENTS 1,996,901 A    4/1935  Burns
4,514,612 A *  4/1985  Nied ................... B23K 35/0205
                                                    219/119
(Continued)

FOREIGN PATENT DOCUMENTS

CN    103084721 A    5/2013
JP    48-76751 A    10/1973
(Continued)

OTHER PUBLICATIONS

Japanese to English machine translation of JP 2010-247176.*
(Continued)

*Primary Examiner* — Michael G Hoang
(74) *Attorney, Agent, or Firm* — Birch, Stewart, Kolasch & Birch, LLP

(57) ABSTRACT

A spot welding electrode of a donut-shaped electrode wherein even when a welded member of a steel sheet is slanted with respect a plane perpendicular to an axis of the spot welding electrode, a cross tensile strength (CTS) of the spot welded joint can be improved. The donut shape spot welding electrode according to the present invention has an electrode tip and an electrode support. The electrode tip contacts the electrode support to be able to move. Due to this, it is possible to strikingly raise the ability of the donut-shaped electrode to track a steel sheet and make the entire surface of the donut shape contact-and-conduction part contact the steel sheet, so it is possible to secure a high CTS value even if the steel sheet is slanted.

13 Claims, 20 Drawing Sheets

(51) Int. Cl.
*B23K 35/00* (2006.01)
*B23K 35/40* (2006.01)
*B23K 35/02* (2006.01)
*B23K 11/16* (2006.01)
*B23K 103/04* (2006.01)
*B23K 101/18* (2006.01)

(52) U.S. Cl.
CPC .......... *B23K 35/00* (2013.01); *B23K 35/0255* (2013.01); *B23K 35/0261* (2013.01); *B23K 35/40* (2013.01); *B23K 2101/18* (2018.08); *B23K 2103/04* (2018.08)

(58) Field of Classification Search
USPC ........... 219/78.01, 86.1, 86.25, 91.2, 93, 94, 219/86.22, 86.33, 145.1
See application file for complete search history.

(56) References Cited

U.S. PATENT DOCUMENTS

| | | | |
|---|---|---|---|
| 4,623,775 A | 11/1986 | Lange | |
| 2003/0192863 A1 | 10/2003 | Wang et al. | |
| 2005/0029233 A1* | 2/2005 | Schuhen | B23K 11/115 219/86.22 |
| 2010/0243616 A1 | 9/2010 | Goto | |
| 2013/0075378 A1 | 3/2013 | Sakai | |
| 2015/0158110 A1 | 6/2015 | Kang et al. | |

FOREIGN PATENT DOCUMENTS

| | | |
|---|---|---|
| JP | 49-45212 S | 4/1974 |
| JP | 61-117383 U | 7/1986 |
| JP | 62-238080 A | 10/1987 |
| JP | 2007-253166 A | 10/2007 |
| JP | 2010-131666 A | 6/2010 |
| JP | 2010-247176 A | 11/2010 |
| JP | 2010-253551 A | 11/2010 |
| WO | WO 2013/163874 A1 | 11/2013 |
| WO | WO 2013/176509 A1 | 11/2013 |

OTHER PUBLICATIONS

Japanese Office Action, dated May 23, 2017, for corresponding Japanese Application No. 2015-551588, with an English translation.
Furusako et al., "Current Problems and the Answer Techniques in Welding Technique of Auto Bodies—First Part", Nippon Steel Technical Report No. 103, May 2013, pp. 69-75.
International Search Report for PCT/JP2014/082314 dated Feb. 17, 2015.
Written Opinion of the International Searching Authority for PCT/JP2014/082314 (PCT/ISA/237) dated Feb. 17, 2015.
Japanese Office Action dated Feb. 28, 2017, issued in corresponding Japanese Patent Application No. 2015-0551588.
Indian Office Action for corresponding Indian Application No. 201617012298, dated Feb. 27, 2019, with English translation.
Mexican Office Action for corresponding Mexican Application No. MX/a/2016/006346, dated Oct. 3, 2019, with an English translation.

* cited by examiner (a)

(b)

(a)

(b)

CONVENTIONAL ART

CONVENTIONAL ART

SPOT WELDING ELECTRODE AND WELDING APPARATUS AND WELDING METHOD USING SAME

TECHNICAL FIELD

The present invention relates to a spot welding apparatus, more particularly relates to an apparatus for resistance spot welding obtaining a weld having a stable outside diameter.

BACKGROUND ART

"Spot welding" is the process of superposing two welded members, bringing columnar electrodes into contact with a weld location from the top and bottom, and applying pressure while running current so as generate Joule's heat by the resistance of the conduction path and using this to form a weld (below, "nugget").

In recent years, to realize performance such as compliance with safety standards for vehicle bodies and reduction of the environmental load, high strength steel sheet having a 1500 MPa or more tensile strength is used.

However, for example, NPLT 1 reports that the tensile shear strength (TSS) of a spot welded joint tends to increase along with the strength of the steel sheet, but the cross tensile strength (CTS) of the spot welded joint falls when the strength of the steel sheet becomes 780 MPa or more. In high strength steel sheet with a strength of the steel sheet of 780 MPa or more, improvement of the cross tensile strength (CTS) of the spot welded joint is a critical issue. The spot welding electrode according to the present invention does not have to be limited to a steel sheet as the welded member, but in this Description, the welded member will be explained as a steel sheet.

It is known that the cross tensile strength (CTS) of a spot welded joint is improved if the nugget increases in outer circumferential length. R&D has been conducted to increase nugget size. However, the problem is faced that if trying to enlarge a nugget, the current required for the spot welding also becomes larger and as a result the spot welding apparatus also has to be made larger.

Therefore, R&D is underway for realizing a suitable cross tensile strength (CTS) of a spot welded joint by using a suitable size spot welding apparatus.

PLT 1 discloses a welding electrode designed to improve the cross tensile strength (CTS) of a spot welded joint by making the nugget a donut shape and thereby increasing the circumferential length without changing the area. Specifically, it discloses a spot welding electrode making the electrode a donut shape so as to enable the formation of a donut-shaped (ring-shaped) nugget and providing a cylindrical shaped hollow part so that the center does not contact the steel sheet.

FIG. 18 is a conceptual view of a spot welding apparatus having conventional spot welding electrodes, while FIG. 19 is a conceptual view of a conventional spot welding electrode.

In FIG. 18, 140 indicates a spot welding apparatus having conventional spot welding electrodes, 50 indicates steel sheets, and 100 indicates conventional spot welding electrodes.

In FIG. 19, a contact-and-conduction surface 105 of a contact-and-conduction part 104 contacting and conductive with the steel sheet is, for example, formed as a donut shape (circular ring shape) projection. By the projection contacting the steel sheet, a so-called donut-shaped nugget is formed. In the Description, an electrode having a donut shaped contact-and-conduction part will be called a "donut-shaped electrode".

PLT 2 discloses a method of judging whether a nugget is suitably formed so as to manage the quality of spot welding. PLT 2 describes to perform spot welding using for at least one welding electrode among the pair of welding electrodes performing spot welding a welding electrode with an electrode surface of a substantially projecting curved surface and with a center of the electrode surface formed with a recess set to a predetermined depth whereby the weld formed in the metal surface reaches the deepest part when spot welding forms a good nugget and to judge that the spot welding zone is suitably formed with a nugget based on the fact of the resistance value at the time of welding becoming a balanced state.

CITATION LIST

Patent Literature

PLT 1. Japanese Patent Publication No. 2010-131666A
PLT 2. Japanese Patent Publication No. 2007-253166A
PLT 3. Japanese Patent Publication No. 2010-247176A Nonpatent Literature NPLT 1. Seiji Furusako et al., "Recent Topics in Bonding Technology for Car Bodies and Technology for Dealing With Same—Part 1", Nippon Steel Technical Report, 2012, 193, pages 69 to 75

SUMMARY OF INVENTION

Technical Problem

In spot welding, ideally, the axis of the facing electrodes (below, referred to as the "electrode axis") is perpendicular to the steel sheet. Due to this, the electrodes contacting the two sides of the steel sheets are matched in position whereby an ideal nugget is obtained. However, in practice, it is rare for the steel sheets to be perpendicular to the electrode axis. When the electrodes are point shaped, even if the steel sheets and the electrode axis are not perpendicular, current flows between the electrodes in point contact, so the nugget shape is generally stably obtained. However, in the case of donut-shaped electrodes, the electrodes themselves have area, so if the steel sheets and the electrode axis are not perpendicular, a state of "one-sided contact" occurs. In this case, the state of contact of the electrodes at the two sides of the steel sheets is not constant, so as a result the nugget shape is not stable.

Normally, steel sheets have various shapes and bends, so the electrode axis and steel sheets are not necessarily perpendicular. Therefore, if using donut-shaped electrodes, such a "one-sided contact" state frequently occurs. For this reason, often, even if using donut-shaped electrodes, often a suitable donut-shaped nugget cannot be obtained and a sufficient cross tensile strength (CTS) cannot be obtained. As art for raising the weldability even if the steel sheets are somewhat slanted with respect to the electrodes, it is disclosed to add head wagging mechanisms to the electrode holders for multipoint simultaneous welding (PLT 3). However, the electrodes themselves are point-shaped electrodes and not donut-shaped electrodes (PLT 3). If point-shaped electrodes, they contact the steel sheets by point contact, so current is conducted between the point-shaped electrodes and the nugget never becomes unstable.

On the other hand, with donut-shaped electrodes, the electrodes themselves are planar shapes, so the state of contact with the welded members does not become constant and the nugget shape becomes unstable. Even if applying donut-shaped electrodes to PLT 3, it is not possible to eliminate the "one-sided contact" at multiple points simultaneously. Furthermore, in the case of donut-shaped electrodes, sometimes the steel sheets deform at the time of spot welding and contact the recessed sunken parts at the electrode centers. In this case, while donut-shaped electrodes, abnormal conduction occurs where there is conduction from the electrode centers as well and a donut-shaped nugget cannot be obtained. That is, to obtain a stable donut-shaped nugget, the "one-sided contact" due to the steel sheets and electrode axis not being perpendicular and abnormal conduction of the centers due to deformation of the steel sheets become problems.

The present invention has as its object to solve the above problem. That is, it has as its object to stably obtain a nugget exhibiting a high CTS value even when the steel sheets are not perpendicular to the axis of the pair of facing spot electrodes (electrode axis) in spot welding due to the donut-shaped electrodes or when the steel sheets are not flat, but have somewhat of a slant or bend. Furthermore, it has as its object to obtain a spot welding electrode which is free of abnormal conduction at the donut-shaped electrode center even if the steel sheets deform at the time of spot welding and which can give a stable nugget. Further, it has as its object to provide a spot welded joint of a high strength steel sheet with a tensile strength of 780 MPa or more where a sufficient level of cross tensile strength (CTS) can be secured.

Solution to Problem

The inventors engaged in intensive R&D and as a result discovered that by adding a movable mechanism to a donut-shaped electrode itself, it is possible to strikingly raise the ability to track a steel sheet and make the entire surface of the donut shaped contact-and-conduction part contact the steel sheet. For example, by configuring the electrode by an electrode tip and an electrode support and making the electrode tip able to swing with respect to the electrode support, the electrode tip can contact a steel sheet by the entire surface of the donut electrode while following the slant of the steel sheet. At this time, the center lines of the contact-and-conduction parts of the two facing electrodes (center lines of conduction) do not necessarily match (FIG. 7), but it was discovered that even if offset by a certain extent, a good donut-shaped nugget is obtained. In experiments of the inventors, it was confirmed that a donut-shaped nugget can be stably obtained even if the steel sheets are slanted by about 20° from the reference plane perpendicular to the electrode axis. Further, it was confirmed that when the steel sheets are slanted 20°, a CTS value in the present invention electrode higher than the CTS value in a normal electrode (point-shaped electrode) when the steel sheets are not slanted can be secured. Further, the contact-and-conduction part is not limited to a donut shape and may be any closed curve. In particular, it may be a projecting polygonal shape or regular polygonal shape closed curve. Below, in this Description, these closed curve shapes will be referred to all together as a "donut shape" in the explanation. Furthermore, the inventors engaged in intensive studies and as a result discovered that by placing an insulating material at the center of a donut electrode, even if a steel sheet deforms, it is possible to keep the welded member from contacting the electrode center and prevent abnormal conduction.

The present invention was made based on these discoveries and has as its gist the following:

(1) A spot welding electrode having an electrode tip having a donut shape contact-and-conduction part and an electrode support supporting the electrode tip, in which spot welding electrode, the electrode tip contacts the electrode support to be able to move.

(2) The spot welding electrode according to (1), wherein the electrode tip contacts the electrode support to be able to swing.

(3) The spot welding electrode according to (2), wherein a tail of the electrode tip and a head of the electrode support forming contact parts of the electrode tip and the electrode support are spherical crown shapes.

(4) The spot welding electrode according to (3), wherein radii of curvature of the tail of the electrode tip and the head of the electrode support are 4 mm to 20 mm and a radius of curvature of the tail of the electrode tip is −5% to +10% of a radius of curvature of the head of the electrode support.

(5) The spot welding electrode according to any one of (1) to (4), wherein in the contact-and-conduction part, an area of a contact-and-conduction surface contacting and conductive with a welded member is 12 mm$^2$ to 70 mm$^2$ and a diameter D of a smallest circle surrounding the contact-and-conduction surface is 8 mm to 20 mm.

(6) The spot welding electrode according to any one of (1) to (5), wherein in the contact-and-conduction part, a contact-and-conduction surface contacting and conductive with a welded member is a closed curve of a circular ring, elliptical ring, or n-sided polygon (n≥3) with a 0.3 mm to 2.5 mm width.

(7) The spot welding electrode according to any one of (1) to (6), wherein the donut shape contact-and-conduction part has an insulating member placed at its center. Alternatively, the spot welding electrode according to any one of (1) to (6), wherein a part other than the contact-and-conduction surface of the head of the tip has an insulating member.

(8) The spot welding electrode according to any one of (1) to (7), wherein the metal used for the electrode tip and the electrode support is copper or a copper alloy.

(9) The spot welding electrode according to any one of (1) to (8), further having means for holding the electrode tip and the electrode support together (below, referred to as "tip-support holding means").

(10) The spot welding electrode according to any one of (1) to (9), wherein the tip-support holding means are spring hooks.

(11) A spot welding apparatus for spot welding at least two steel sheets, which spot welding apparatus has a spot welding electrode according to any one of (1) to (10) as at least one of the spot welding electrodes.

(12) A spot welding method for spot welding at least two steel sheets, which spot welding method uses a spot welding electrode according to any one of (1) to (11) as at least one of the spot welding electrodes.

Advantageous Effects of Invention

By using the donut shape spot welding electrode of the present invention, the spot welding electrodes and the steel sheets contact each other planarly and a donut-shaped nugget can be stably obtained even when the steel sheets are not perpendicular to but are slanted from the pair of spot welding electrodes at the top and bottom or when the steel sheets are not flat but are somewhat slanted or bent. Due to this, the remarkable effect is exhibited of improving the cross tensile strength (CTS) of the spot welded joint at so-called high strength steel sheets with a strength of the steel sheets of 780 MPa or more.

BRIEF DESCRIPTION OF DRAWINGS

FIG. 1A-1 to FIG. 1B are conceptual views showing one embodiment of a spot welding electrode according to the present invention. They show the case where the contact-and-conduction part is a split circular ring shape and the electrode tip tail is a recessed spherical crown. FIG. 1A-1 is a bird's eye view of the electrode tip from the contact-and-conduction part side. FIG. 1A-2 is a cross-sectional view along the electrode axis of the electrode tip and a cross-sectional view along A-A of FIG. 1A-1. FIG. 1B is a view showing an electrode support.

FIG. 2A-1 to FIG. 2B are conceptual views showing one embodiment of a spot welding electrode according to the present invention. They show the case where the contact-and-conduction part is formed by arc shapes and the electrode tip tail is a projecting spherical crown. FIG. 2A-1 is a bird's eye view of the electrode tip from the contact-and-conduction part side. FIG. 2A-2 is a cross-sectional view along the electrode axis of the electrode tip and a cross-sectional view along B-B of FIG. 2A-1. FIG. 2B is a view showing an electrode support.

FIG. 3A-1 to FIG. 3B are conceptual views showing one embodiment of a spot welding electrode according to the present invention. They show the case where the contact-and-conduction part is formed by arc shapes and the electrode tip tail is a recessed spherical crown larger than a half sphere. The explanations of FIG. 3A-1, FIG. 3A-2, and FIG. 3B are based on FIG. 1A-1 to 1B.

FIG. 4A-1 to FIG. 4B are conceptual views showing one embodiment of a spot welding electrode according to the present invention. They show the case where the contact-and-conduction part is formed by arc shapes and the electrode tip tail is a projecting spherical crown larger than a half sphere. The explanations of FIG. 4A-1, FIG. 4A-2, and FIG. 4B are based on FIGS. 2A-1 to 2B.

FIGS. 8A-1 to 8B are conceptual views showing one embodiment of a spot welding electrode according to the present invention. They show the case where the contact-and-conduction part is a circular ring shape and the electrode tip tail is a recessed spherical crown. The explanations of FIG. 8A-1, FIG. 8A-2, and FIG. 8B are based on FIGS. 1A-1 to 1B.

FIGS. 9A-1 to 9B is conceptual views showing one embodiment of a spot welding electrode according to the present invention. They show the case where the contact-and-conduction part is a circular ring shape and the electrode tip tail is a projecting spherical crown. The explanations of FIG. 9A-1, FIG. 9A-2, and FIG. 9B are based on FIGS. 1A-1 to 1B.

FIGS. 10A-1 to 10B are conceptual views showing one embodiment of a spot welding electrode according to the present invention. They show the case where the contact-and-conduction part is a hexagonal shape and the electrode tip tail is a recessed spherical crown. The explanations of FIG. 10A-1, FIG. 10A-2, and FIG. 10B are based on FIGS. 1A-1 to 1B.

FIGS. 11A-1 to 11B are conceptual views showing one embodiment of a spot welding electrode according to the present invention. They show the case where the contact-and-conduction part is a hexagonal shape and the electrode tip tail is a recessed spherical crown. The explanations of FIG. 11A-1, FIG. 11A-2, and FIG. 11B are based on FIGS. 1A-1 to 1B.

FIGS. 12A-1 to 12B are conceptual views showing one embodiment of a spot welding electrode according to the present invention. They show the case where the contact-and-conduction part is a split circular ring shape and the electrode tip tail is a recessed spherical crown. The explanations of FIG. 12A-1, FIG. 12A-2, and FIG. 12B are based on FIGS. 1A-1 to 1B.

FIGS. 13A-1 to 13B are conceptual views showing one embodiment of a spot welding electrode according to the present invention. They show the case where the contact-and-conduction part is a split circular ring shape and the electrode tip tail is a recessed spherical crown. The explanations of FIG. 13A-1, FIG. 13A-2, and FIG. 13B are based on FIGS. 1A-1 to 1B.

FIG. 14A shows the case of use of spot welding electrodes shown in FIGS. 1A-1 to 1B at the top and bottom, while FIG. 14B explains the case of use of a spot welding electrode shown in FIGS. 1A-1 to 1B at one side and the case of use of a conventional spot welding electrode at the other side.

FIG. 15A shows the case of use of spot welding electrodes shown in FIGS. 2A-1 to 2B at the top and bottom, while FIG. 15B explains the case of use of a spot welding electrode shown in FIGS. 2A-1 to 2B at one side and the case of use of a conventional spot welding electrode at the other side.

FIG. 16A shows the case of use of spot welding electrodes shown in FIGS. 1A-1 to 1B at the top and bottom, while FIG. 16B explains the case of use of a spot welding electrode shown in FIGS. 1A-1 to 1B at one side and the case of use of a conventional spot welding electrode at the other side.

FIG. 17A shows the case of use of spot welding electrodes shown in FIGS. 2A-1 to 2B at the top and bottom, while FIG. 17B explains the case of use of a spot welding electrode shown in FIGS. 2A-1 to 2B at one side and the case of use of a conventional spot welding electrode at the other side.

FIG. 19A is a view when viewing the conventional spot welding electrode from the head, while FIG. 19B shows a K-K cross-section in FIG. 19A.

DESCRIPTION OF EMBODIMENTS

Details of the present invention will be explained below. As explained above, in this Description, the welded members will be explained as steel sheets.

The spot welding electrode according to the present invention has an electrode tip and an electrode support supporting the same. At one end of the electrode tip, there is a contact-and-conduction part for contacting a steel sheet and causing electrical conduction. The contact-and-conduction part of the electrode according to the present invention has the shape of a donut for obtaining a donut-shaped nugget. Here, a "donut shape" indicates a continuous closed curve having a width not 0 or a plurality of a group of arcs or line segments having widths not 0 present on a closed curve. Of course, it includes a circular ring shape of consecutive arcs (total circumference), a group of arcs present on the same circle (also called "split circular ring"), and elliptical shapes and polygonal shapes (in particular projecting polygonal shapes are preferred). However, when split into a plurality of arcs or line segments having widths not 0 on a closed curve, a smaller number of splits is preferable, specifically four or less splits are preferable.

The electrode support is supported by an electrode holder. The axis of the electrode support matches with the axis of the spot welding electrode (electrode axis). A pair of the spot welding electrodes are placed facing each other across the steel sheets and current is run across the two electrodes to heat the sheets, so usually the pair of facing electrode axes match.

The electrode tip is structured to be supported at one end of the electrode support while able to move with respect to the electrode support. The electrode tip being "able to move" means the electrode tip can track a steel sheet even if the steel sheet slants with respect to the plane perpendicular to the electrode axis (reference plane). Due to this, the entire surface of the contact-and-conduction part can contact the steel sheet. So long as structured to be able to track a slanted steel sheet, the structure is not particularly limited. In particular, if structured so that the electrode tip can swing about the electrode axis, the electrode tip can rotate about the electrode axis and can track even steel sheet slanted with respect to the reference plane.

Figure 1:
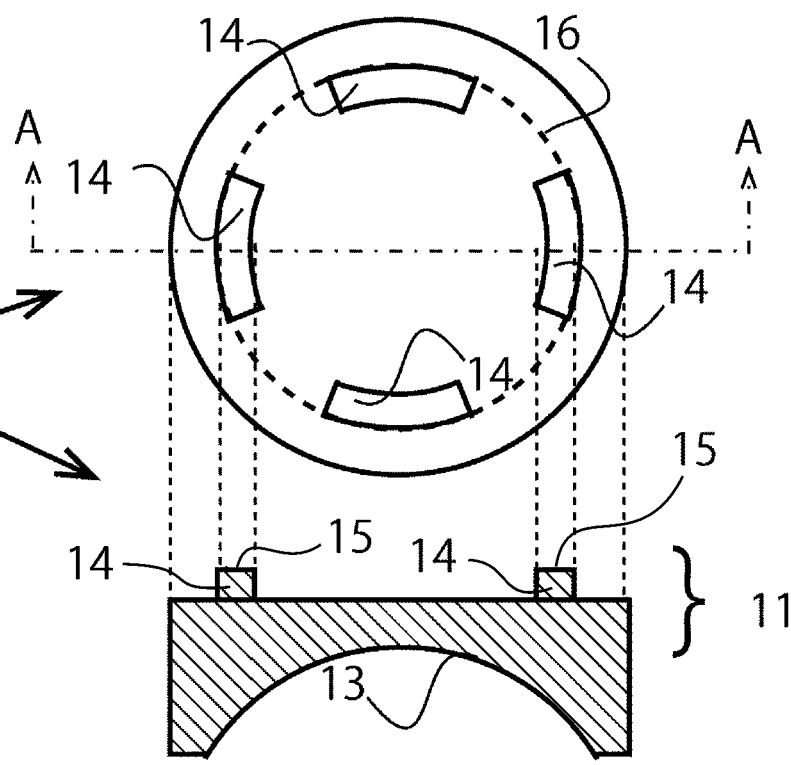
Figure 2:
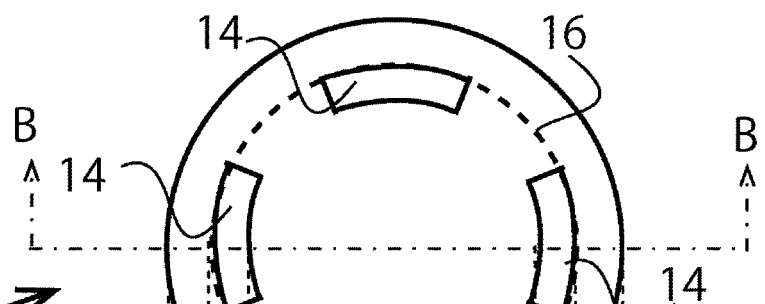
Figure 2:
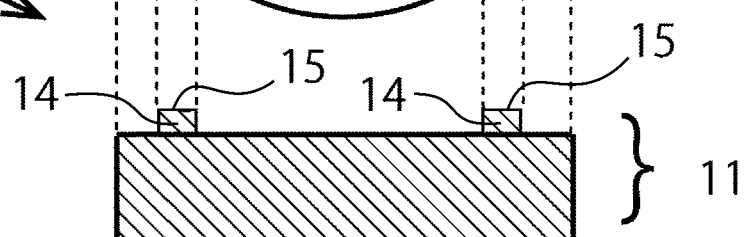
Figure 2:
Figure 2:
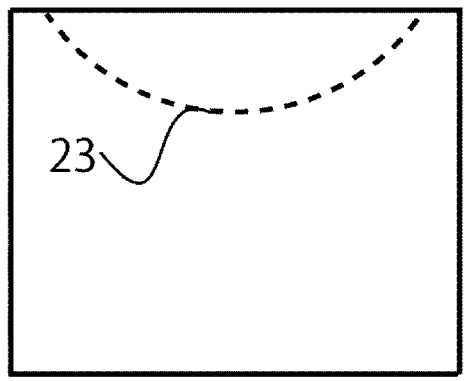
Figure 3:
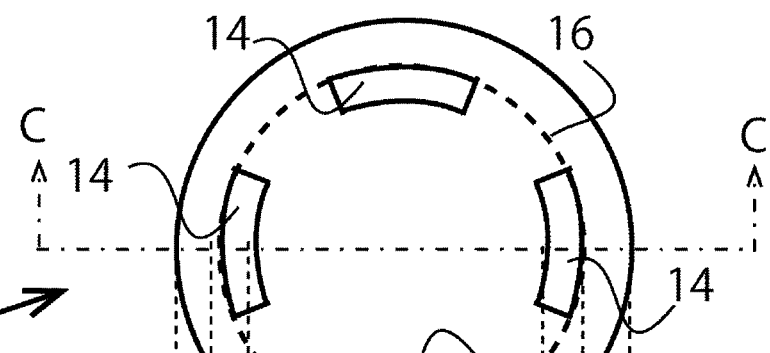
Figure 3:
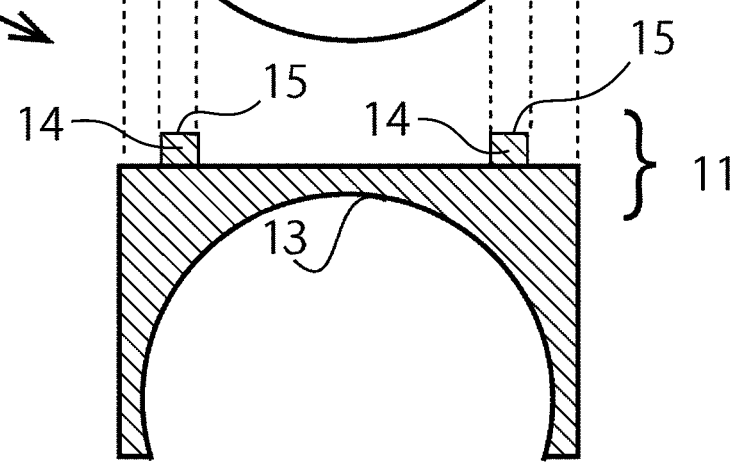
Figure 3:
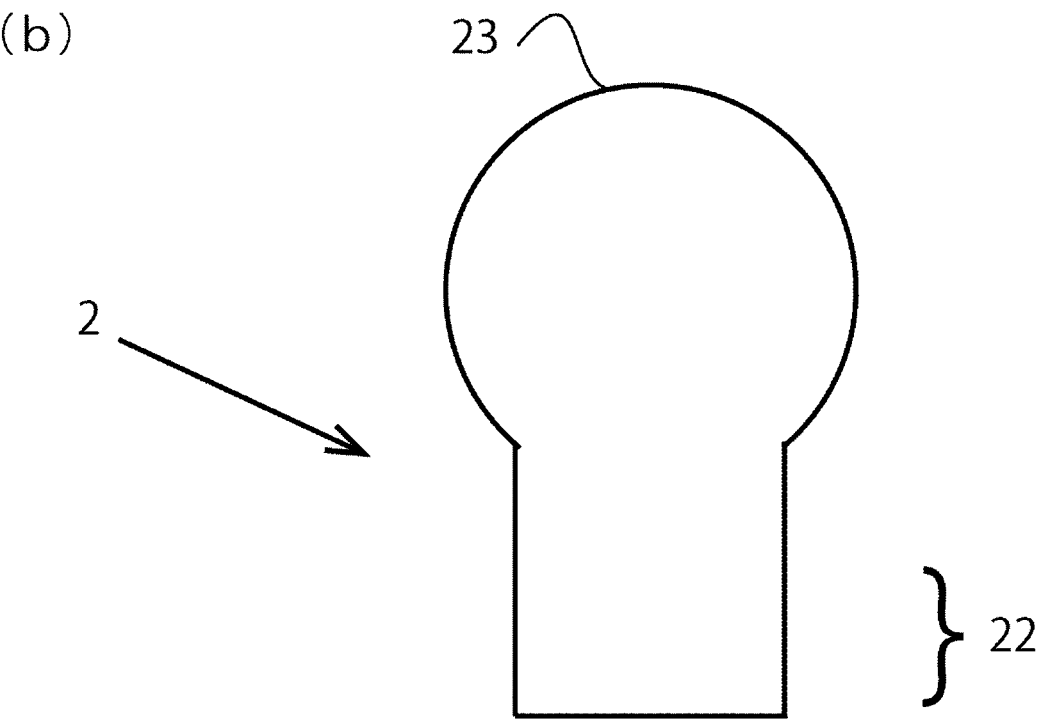
Figure 4:
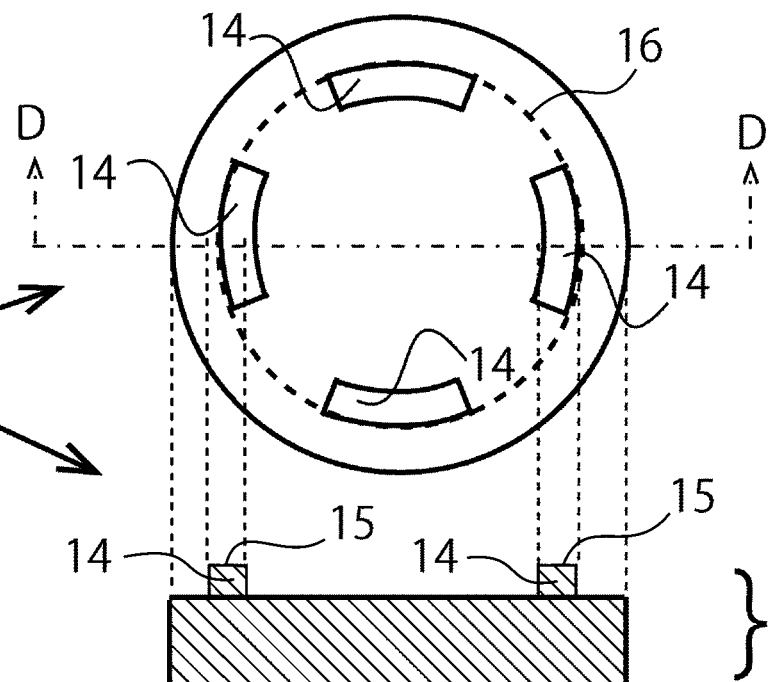
Figure 4:
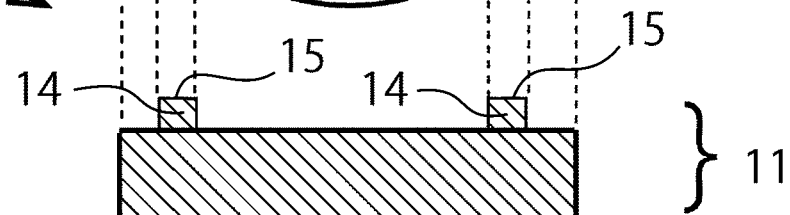
Figure 4:
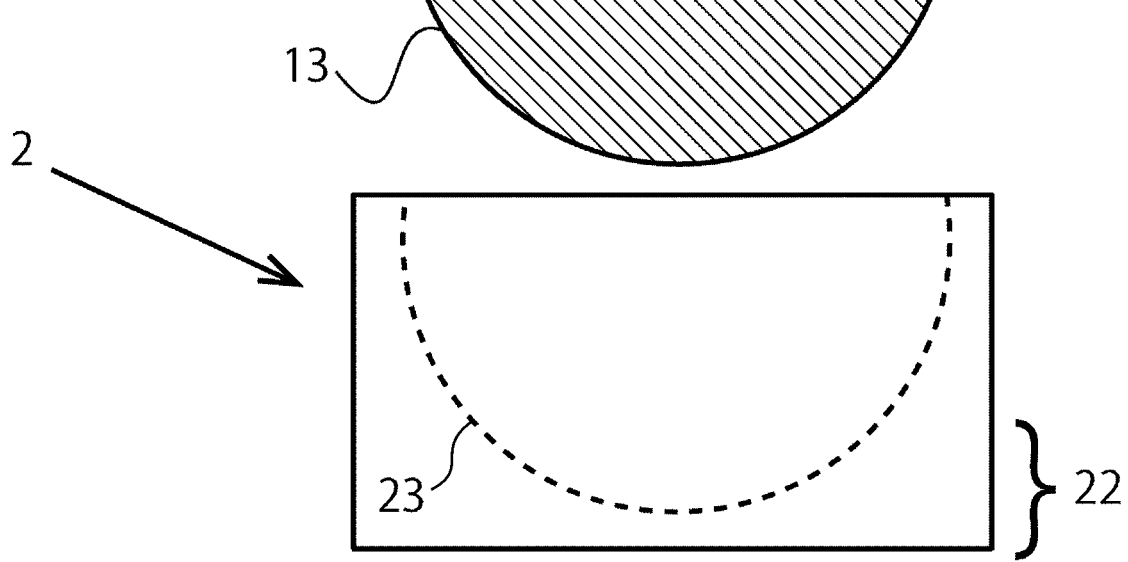

For example, the contact parts of the electrode tip and electrode support, that is, the tail of the electrode tip and the head of the electrode support, may be made spherical crown shapes which fit with each other. For example, as shown in FIG. 1A-1 to FIG. 1B, they may be structured so that the tail of the electrode tip is a recessed spherical crown shape, the head of the electrode support is a projecting spherical crown shape, and the two fit and slide with each other. According to this structure, the electrode tip can swing in all directions about the center of curvature of the spherical crown forming the head of the electrode support and can track a steel sheet slanted from the reference plane. FIGS. 2A-1 to FIG. 2B to FIG. 4A-1 to FIG. 4B are examples of application.

Figure 7:
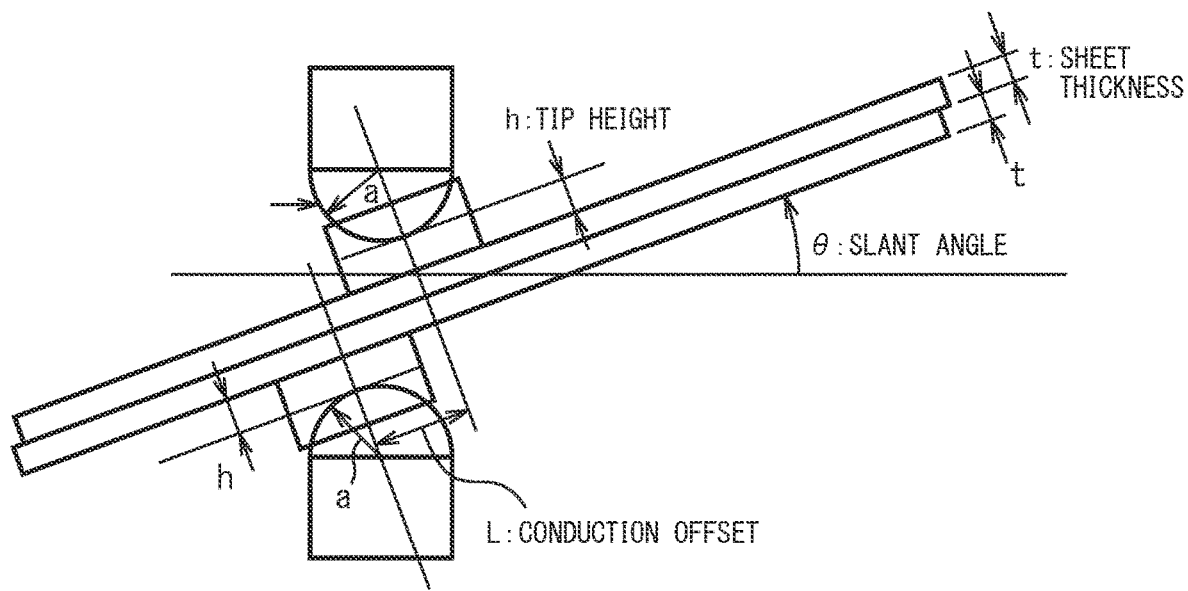
FIG. 7 is a view showing the concept when placing spot welding electrodes according to the present invention straddling slant steel sheets.

FIG. 7 shows the state where spot welding electrodes shown in FIG. 1A-1 to FIG. 1B are made to face each other and steel sheets slanted with respect to a reference plane are placed between the electrodes. The electrode tips track the slant θ of the steel sheets and swing by exactly θ with respect to the electrode axes so that the front surfaces of the contact-and-conduction parts at first ends of the electrode tips contact the steel sheets. At this time, as clear from FIG. 7 as well, the center lines of the contact-and-conduction parts of the facing electrodes (center lines of conduction) do not match. For this reason, the stability of the nugget shape changes depending on the slant angle θ of the steel sheets. The inventors investigated the slant angle of steel sheets and the stability of the nugget shape by experiments.

Figure 20:
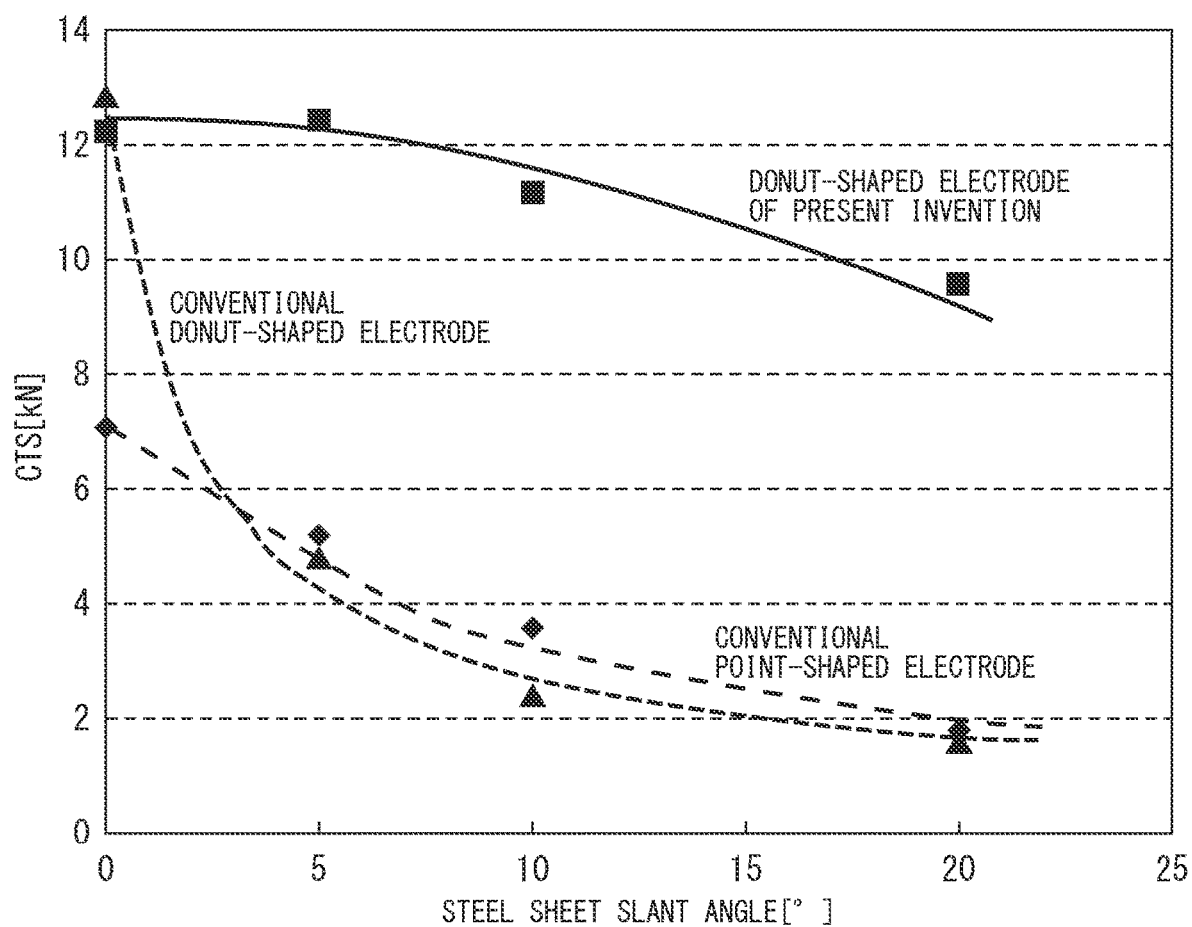
FIG. 20 is a view showing a relationship between a slant angle of steel sheets and a CTS value after spot welding.

FIG. 20 shows the results of investigation of the slant angle of the sheet sheets and stability of the nugget shape using spot welding electrodes according to the present invention, conventional donut-shaped electrodes, and conventional point-shaped electrodes. For the electrodes according to the present invention, No. 5 of Table 2 was used. For the conventional donut-shaped electrodes, No. 2 of Table 2 was used. The conventional point electrodes were generally commercially available electrodes. The indicator of stability of the nugget shape was the CTS value after spot welding.

As clear from FIG. 20 as well, if there is no steel sheet slant (θ=0), by using donut-shaped electrodes, the CTS value becomes about 1.8 times that of the conventional point electrodes and therefore the effect of the donut shape was verified. However, along with the increase of the steel sheet slant, the donut-shaped electrodes become the one-sided contact state resulting in point contact, so the CTS value rapidly falls and becomes equal to that of conventional point-shaped electrodes at a 5° or so slant.

As opposed to this, the electrodes according to the present invention are not affected much at all by the steel sheet slant if about 5°. As the steel sheet slant increases, the conduction offset increases, so the CTS value falls. However, this fall is slight. Even with a steel sheet slant angle of 20° (θ=20°), the value only falls about 17%. An approximately five-fold CTS value was obtained compared with point-shaped electrodes or conventional donut-shaped electrodes.

Here, the geometric relationship of the electrodes according to the present invention will be verified. Here, the length between centerlines of the facing contact-and-conduction parts (conduction offset) is made "L", the radius of a contact-and-conduction part (donut shape) is made "A", the minimum thickness of an electrode tip (distance between apex of spherical crown part and tip of contact-and-conduction part) is made "h", the steel sheet thickness is made "t", and the radius of curvature of the spherical crown of the head of an electrode support is made "a". The steel sheets for spot welding are the same in thickness. Two are superposed for welding. In this case, the following relationship stands geometrically.

$$L=(2a+2h+2t)\tan\theta$$

Unless the projections of the front and back contact-and-conduction parts on the steel sheets at least overlap, the nugget shape will become unstable. Therefore, the following relationship is necessary.

$$2A>L$$

That is, to obtain a nugget shape, the following relationship must be satisfied:

$$A>(a+h+t)\tan\theta$$

For example, in the No. 5 electrode of Table 2 used in the experiments, if a=8 mm, h=3 mm, A=6 mm, and t=2.6 mm, then tan θ<0.44. That is, it is learned that if θ<23.8°, the nugget shape is stable and a high CTS is obtained. While depending also on the electrode or steel sheet thickness or other shape conditions as explained above, it is learned that if a spot welding electrode according to the present invention, with at least a steel sheet slant angle of up to about 10°, the nugget shape stabilizes and a wide circumferential length nugget is obtained, so a high CTS value can be secured.

Next, measures for suppressing abnormal conduction due to deformation of the steel sheets during the spot welding will be explained. Even if using the electrodes according to the present invention, as the steel sheet thickness becomes thinner, deformation of the steel sheets at the time of spot welding is unavoidable. For this reason, contact with the center (recessed sunken part) of a contact-and-conduction part of the donut shape becomes easy. Furthermore, if a donut shape contact-and-conduction part increases in diameter, contact becomes further easier. If the steel sheets contact the center of a donut shape contact-and-conduction part and current ends up running through even the center (abnormal conduction), the nugget shape does not become stable leading to a fall in the CTS value. In fact, even during a spot welding experiment of thin-gauge steel sheets, the above-mentioned abnormal conduction occurs with a probability of several percent. This abnormal conduction causes a drop in the reliability of the spot welding. The inventors solved this problem by placing an insulating member at the center of the donut shape contact-and-conduction part (recessed sunken part) so that conduction does not occur even if a steel sheet deforms. Here, the insulating member may be a material with an internal resistance of $10^5/\Omega m$ or more. This is because if less than $10^5/\Omega m$, with the voltage used in spot welding, insulation breakdown is liable to occur and conduction to result. The thickness of the insulating member should be 0.1 mm or more. If the thickness is less than 0.1 mm, the loss due to the heat at the time of welding is liable to cause consumption of the insulating substance.

Next, an electrode according to the present invention will be explained using examples of embodiments.

First Embodiment

A first embodiment of the present invention is a metal welding use electrode having an electrode tip and an electrode support where the tail of the electrode tip is recessed.

FIG. 1A-1 to FIG. 1B and FIG. 3A-1 to FIG. 3B show a spot welding electrode with a tail of the electrode tip of a recessed shape. FIGS. 1A-1 to FIG. 1B show a spot welding electrode with a recessed tail of the electrode tip where the tail 13 of the electrode tip and the head 23 of the electrode support mechanically contact and with a sliding surface of a spherical crown shape smaller than the radius. FIG. 3A-1 to FIG. 3B show a spot welding electrode with a recessed tail of the electrode type of a spherical crown shape where the tail 13 of the electrode tip and the head 23 of the electrode support mechanically contact and the sliding surface is larger than the radius. The only point of difference is the sliding area by which the tail 13 of the electrode tip and the head 23 of the electrode support mechanically contact. Therefore, to avoid overlapping explanations, below, the explanation will be given in accordance with FIG. 1A-1 to FIG. 1B.

Support

FIG. 1B shows an electrode support, where 23 is the head of the electrode support and 22 is the tail of the support.

(a) Form and Function

The function of the head 23 of the electrode support is to support the electrode tip 1 from the tail 13 of the electrode tip. The electrode support 2 has a bullet-shaped form. The head of the electrode support has a projecting spherical crown shape with a radius of curvature of 4 to 20 mm (in the figure, a semispherical shape). The remaining part is cylindrical. The head 23 of the electrode support contacts and supports the tail 13 of the electrode tip 1. The reason why the head 23 of the electrode support is made a projecting shape with a radius of curvature of 4 to 20 mm is that if the radius of curvature is less than 4 mm), 1) the region where the head 23 of the electrode support and the tail 13 of the electrode tip electrically contact becomes narrower and they are liable to fuse together and 2) the head 23 of the electrode support and the tail 13 of the electrode tip cannot withstand the load by which the electrode is pressed. Further, if the radius of curvature is over 20 mm, the displacement of the electrode tip 1 becomes larger and control of displacement of the electrode tip 1 becomes difficult. While not shown, the tail 22 of the electrode support is connected with an external power supply.

(b) Metal Material

The metal material forming the electrode support is required to be high in electrical conductivity and high in strength, so pure Cu or Cu alloy is preferable. A Cu—Cr alloy is also preferable.

Tip (a) Form and Function

The head 11 of the electrode tip has a contact-and-conduction part 14. This supplies current to the steel sheets. In the contact-and-conduction part 14, the part contacting and conductive with a steel sheet will be called the "contact-and-conduction surface 15". The tail 13 of the electrode tip is supported by the head 23 of the electrode support. Current is supplied from the electrode support 2. The tail 13 of the electrode tip has a recess with a radius of curvature of −5% to +10% of the radius of curvature of the head 23 of the electrode support of the support 2. If the radius of curvature is over 10%, the region where the tail 13 of the electrode tip and the head 23 of the electrode support electrically contact becomes smaller and they are liable to end up fusing together due to the concentration of current. On the other hand, if less than −5%, the tail 13 of the electrode tip and the head 23 of the electrode support become large in contact resistance at their centers and the flow of current becomes harder. Even if the electrode axes of the facing spot electrodes are offset, the electrode tip can slide on the head 23 of the electrode support and therefore the contact-and-conduction surface can evenly contact the steel sheet. In this way, the current supplied from the contact-and-conduction surface 15 can be used to stably form a nugget with a long outer circumference at the steel sheet.

(b) Metal Material

The material of the metal forming the electrode tip 1 is required to be high in electrical conductivity and high in strength, so is preferably pure Cu or Cu alloy. A Cu—Cr alloy is preferable.

Contact-and-Conduction Surface Etc.

(a) Shape

Figure 8:
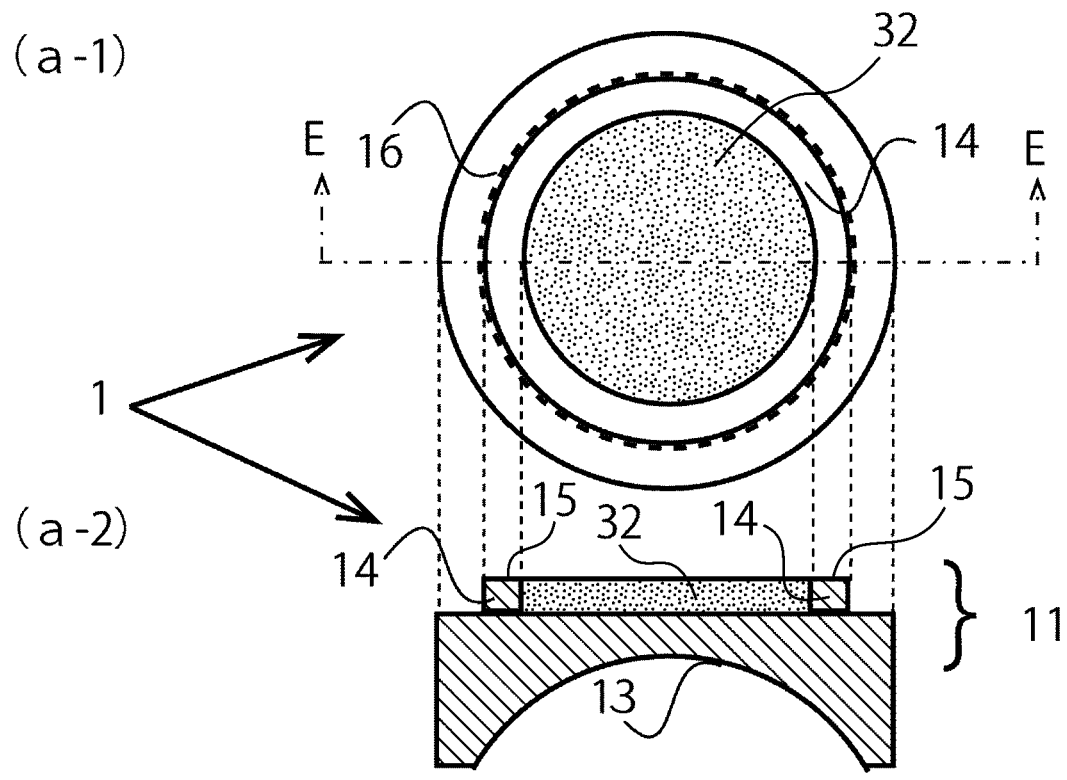
Figure 8:
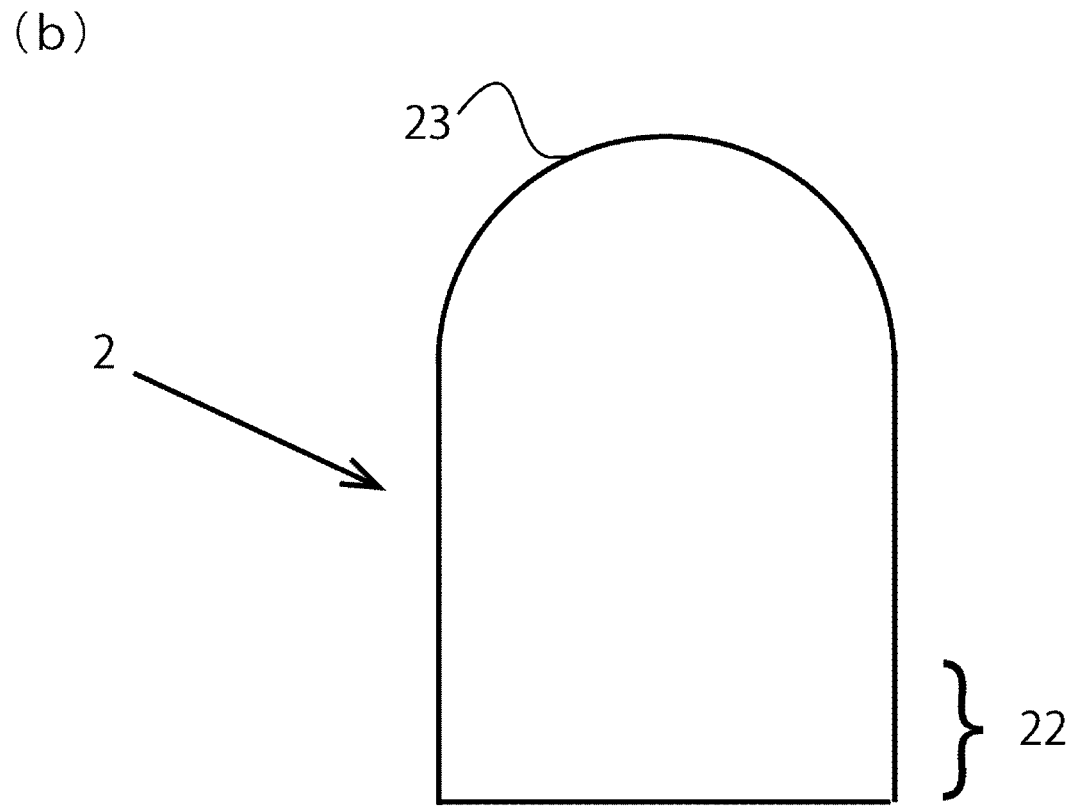
Figure 9:
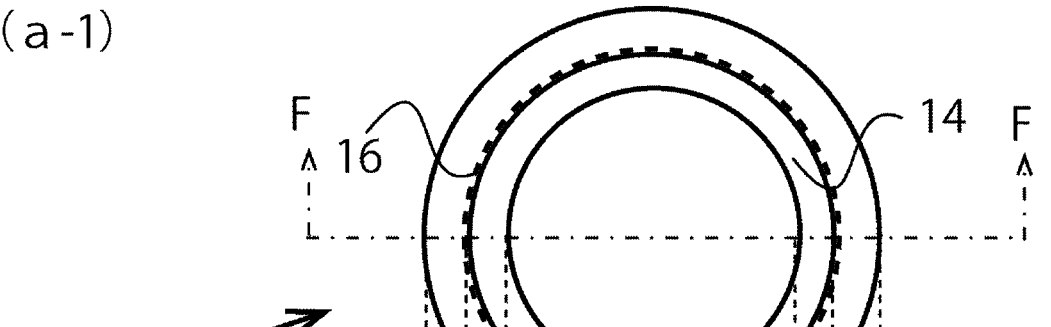
Figure 9:
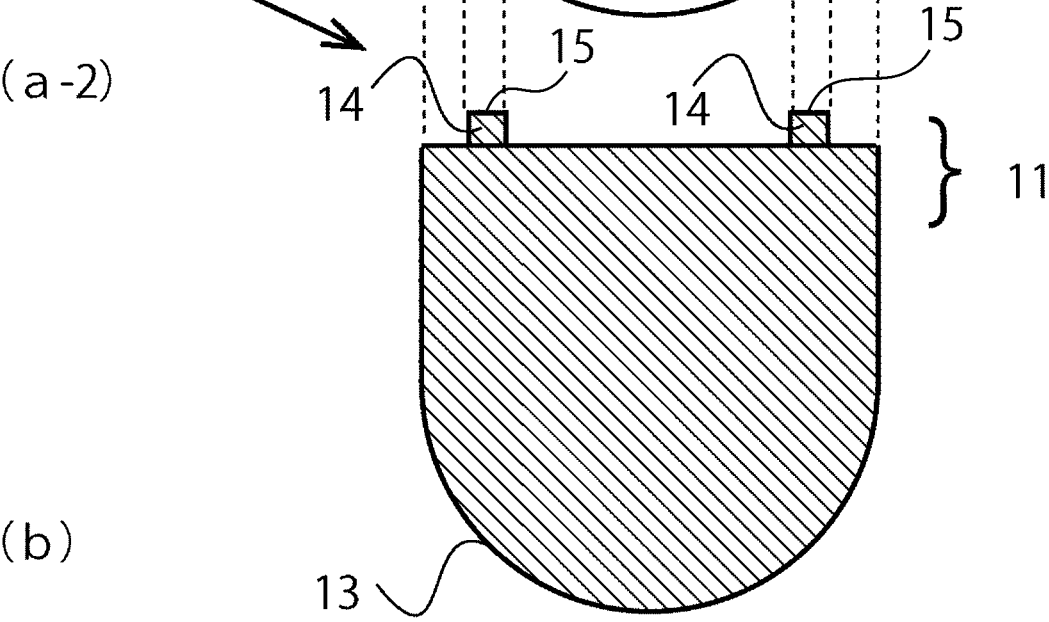
Figure 9:
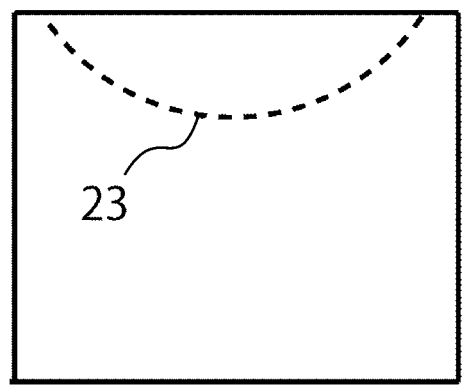

The total S of the area of the contact-and-conduction surface of the contact-and-conduction part 14 positioned at the head 11 of the electrode tip (below, referred to as the "area of the contacting and conduction surface") should be 12 mm² to 70 mm². If the area of the contact-and-conduction surface is less than 12 mm², the current density at the contact-and-conduction part becomes high and the generated heat causes the wear of the electrode to become greater. On the other hand, if over 70 mm², the current density falls and the heat density required for melting (amount of heat generated per unit volume of the steel material) can no longer be obtained. The area of the contact-and-conduction surface is preferably 20 mm² to 60 mm², more preferably 30 mm² to 40 mm². The shape of the contact-and-conduction surface 15 is preferably a circle or ellipse such as shown in FIGS. 8A-1 to 8B or a closed curve such as an n-sided polygon (n≥3) such as shown in FIGS. 10A-1 to 10B.

(b) Diameter of Smallest Surrounding Circle

The diameter D of the smallest circle surrounding all of the contact-and-conduction surface (below, referred to as the "smallest surrounding circle") is an important element. FIG. 1A-1 to FIG. 1B shows the case where the contact-and-conduction part 14 is scattered in island shapes. The circle drawn by the broken line 16 is the smallest surrounding circle. The diameter D of the smallest surrounding circle should be 8 mm to 20 mm. If the diameter of the smallest surrounding circle is 8 mm or less, a sufficiently large nugget cannot be formed. On the other hand, if over 20 mm, the weld area of the steel sheet ends up becoming larger, which is inefficient. The diameter of the smallest surrounding circle is preferably 10 mm to 16 mm, more preferably 12 mm to 15 mm.

(c) Insulating Substance

When the contact-and-conduction surface 15 draws a closed curve, the space inside the closed curve may have a ceramic or other insulating member with a high heat resistance other than air inside it. By having the insulating member, it is possible to prevent deformation of a steel sheet at the time of spot welding from causing the steel sheet to contact the recess of the closed curve side (also referred to as the "center") and from causing abnormal conduction. Furthermore, by the center having the insulating member, the contact-and-conduction surface 15 and the center become the same plane, so the shock when the contact-and-conduction surface 15 contacts the steel sheet is eased. Using the electrode of FIGS. 8A-1 to 8B as an example, an example of placement of the insulating member 32 at the inside of the contact-and-conduction part 14 will be shown.

Holding Springs

Figure 5:
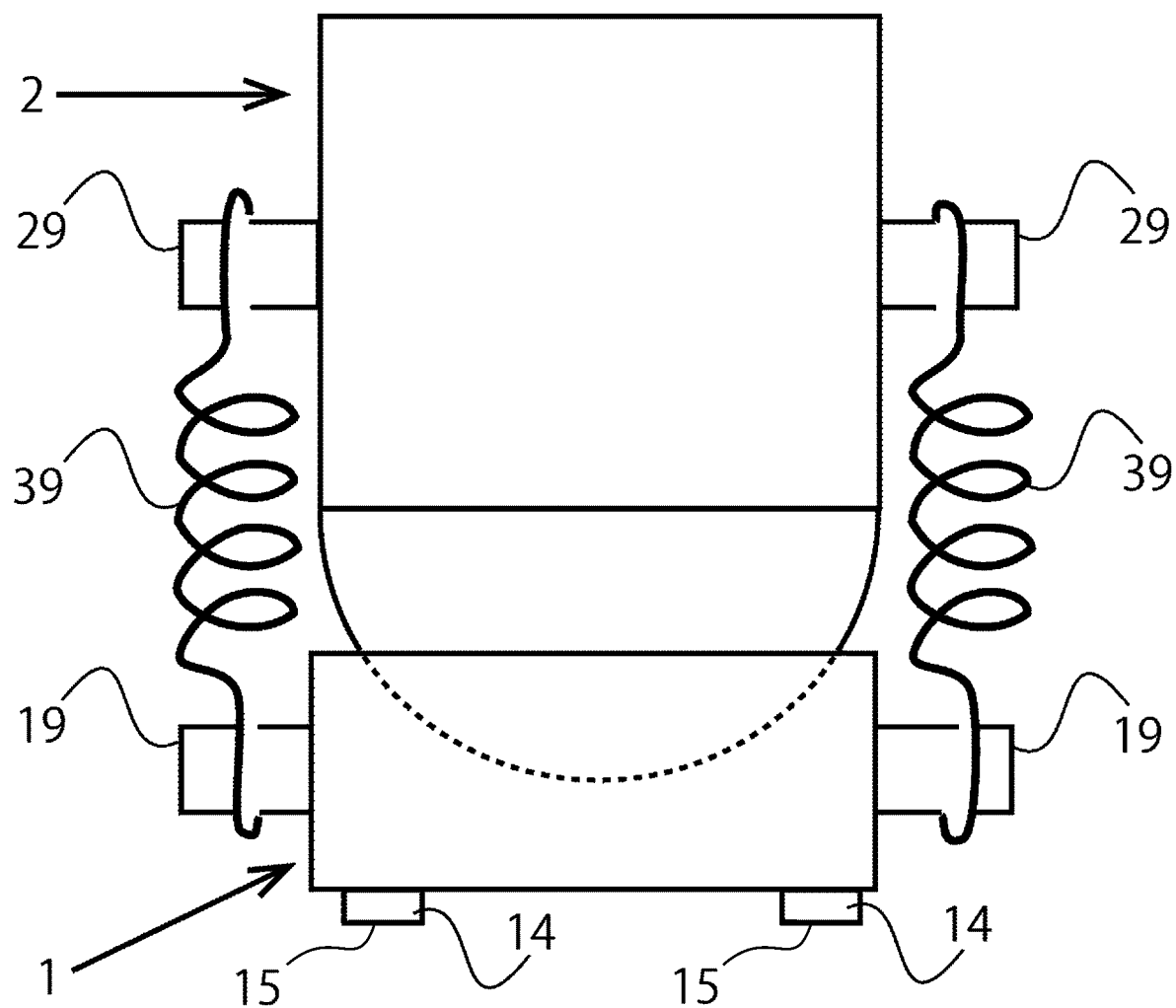
FIG. 5 is a view for explaining one embodiment of a spot welding electrode according to the present invention having a spring holding mechanism.
Figure 6:
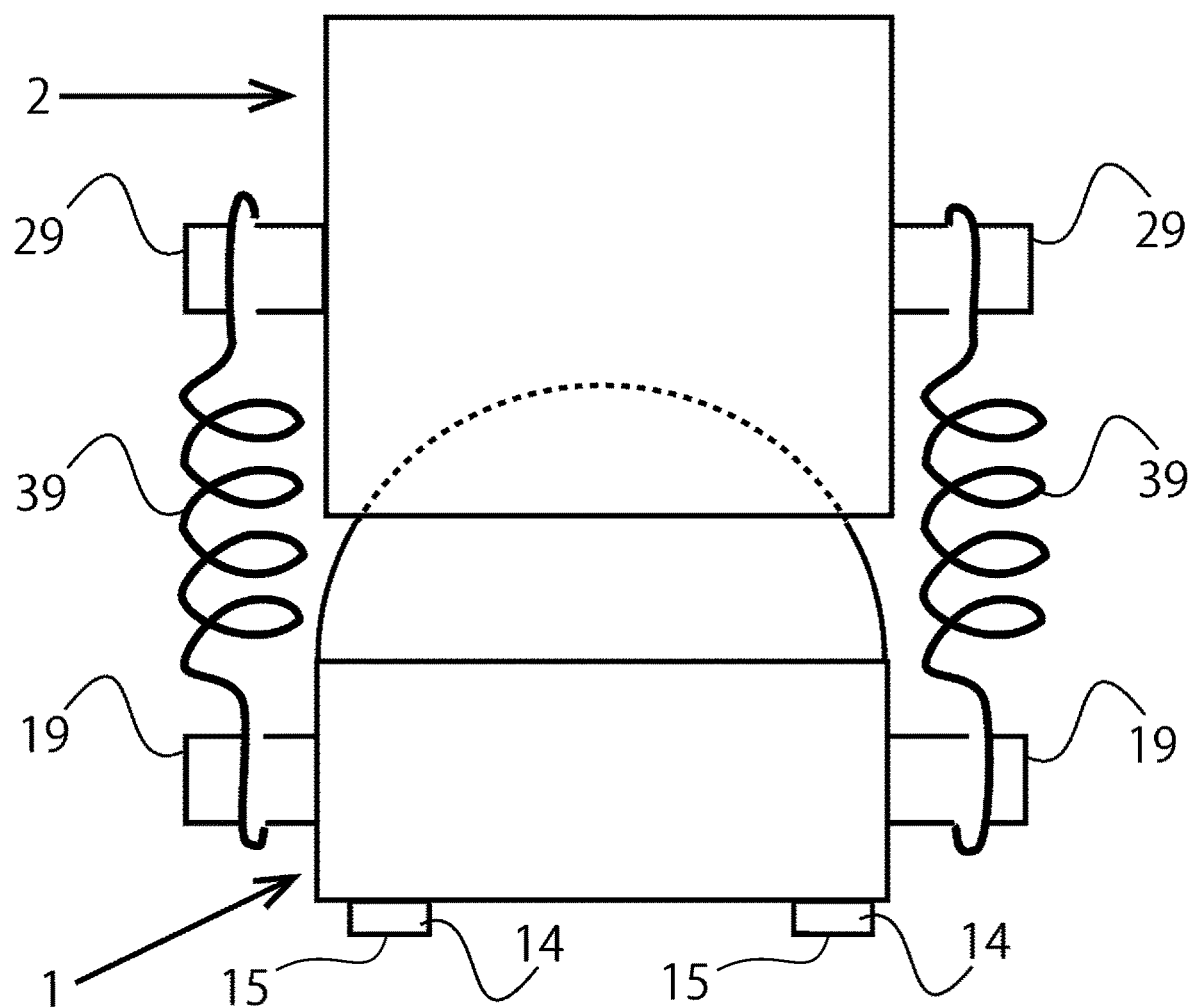
FIG. 6 is a view for explaining one embodiment of a spot welding electrode according to the present invention having a spring holding mechanism.

FIG. 5 is a view for explaining a spot welding electrode equipped with holding springs according to the present invention. In FIG. 5, 19 indicates spring hooks for holding the electrode tip, 29 indicate spring hooks for holding the electrode support, and 39 indicates holding springs. As shown in FIG. 5, the holding springs 39 enable the electrode tip 1 to be pushed against the electrode support 2.

Second Embodiment

The second embodiment of the present invention is a metal welding electrode having an electrode tip and an electrode support wherein the tail of the electrode tip is a projecting type.

FIG. 2A-1 to FIG. 2B and FIG. 4A-1 to FIG. 4B show a spot welding electrode with a recessed tail of the electrode tip. The electrode of FIG. 2A-1 to FIG. 2B differs from the electrode of FIG. 1A-1 to FIG. 1B in that the tail of the electrode tip is recessed, but the other requirements and the substantive functions are the same as the electrode of FIG. 1A-1 to FIG. 1B. In the same way, the electrode of FIG. 4A-1 to FIG. 4B differs from the electrode of FIG. 3A-1 to FIG. 3B in that the tail of the electrode tip is recessed. The other requirements and substantive functions are the same as the electrode of FIG. 4A-1 to FIG. 4B. Here, overlapping explanations are avoided, but the electrode of the first embodiment and the electrode of the second embodiment have substantially the same functions.

Spot Welding Apparatus

Figure 14:
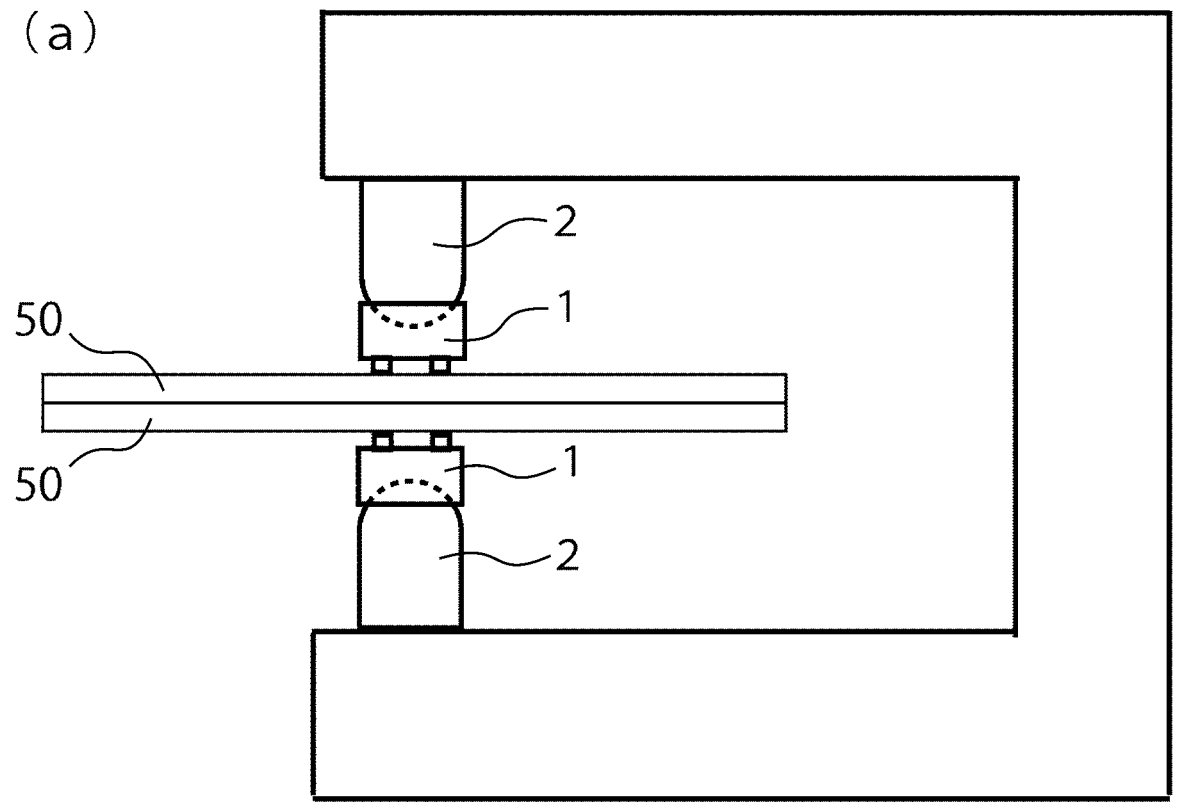
FIGS. 14A and 14B are views for explaining the concept of an apparatus equipped with of spot welding electrodes according to the present invention.
Figure 14:
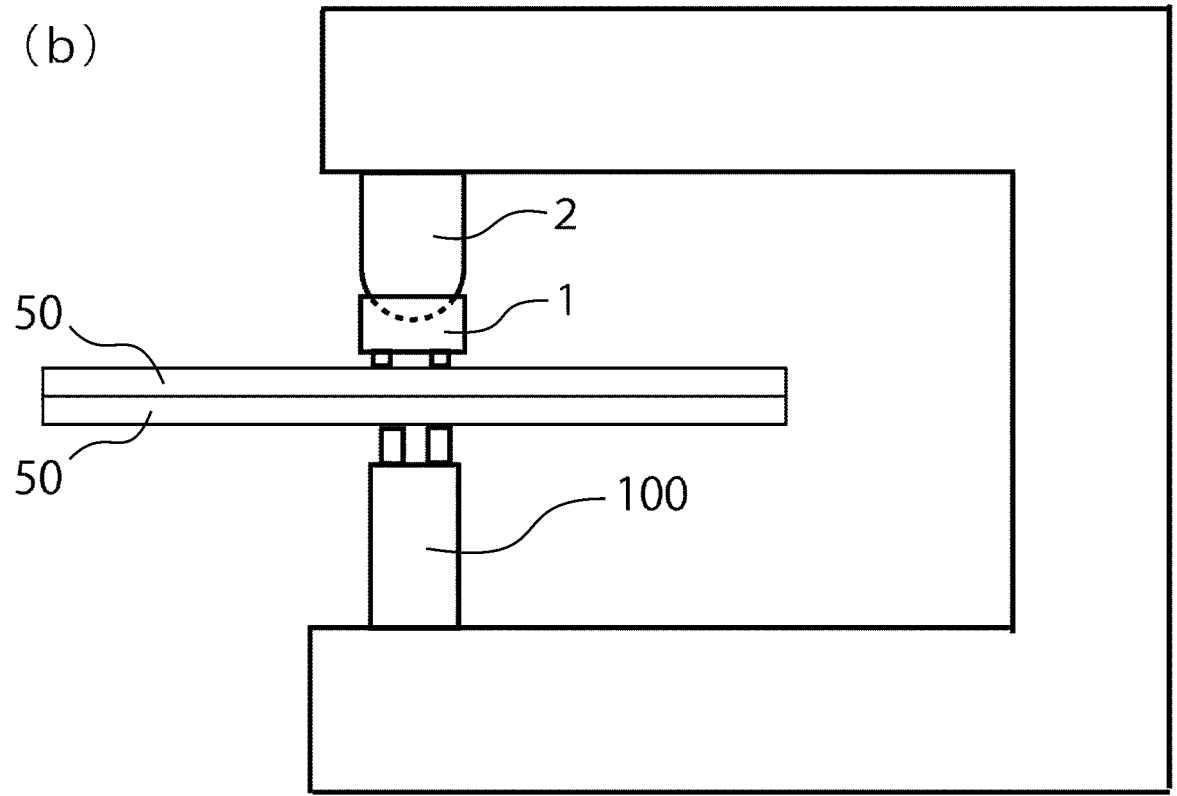
Figure 15:
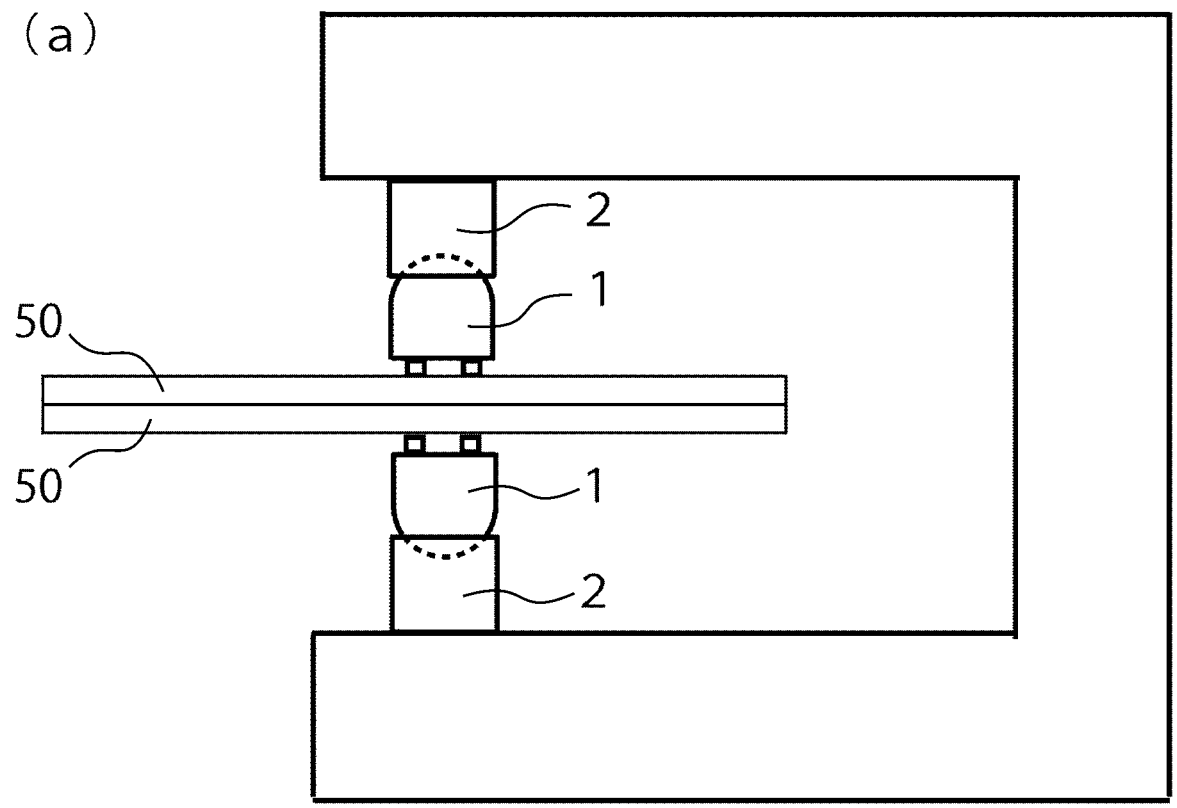
FIGS. 15A and 15B are views for explaining the concept of an apparatus equipped with of spot welding electrodes according to the present invention.
Figure 15:
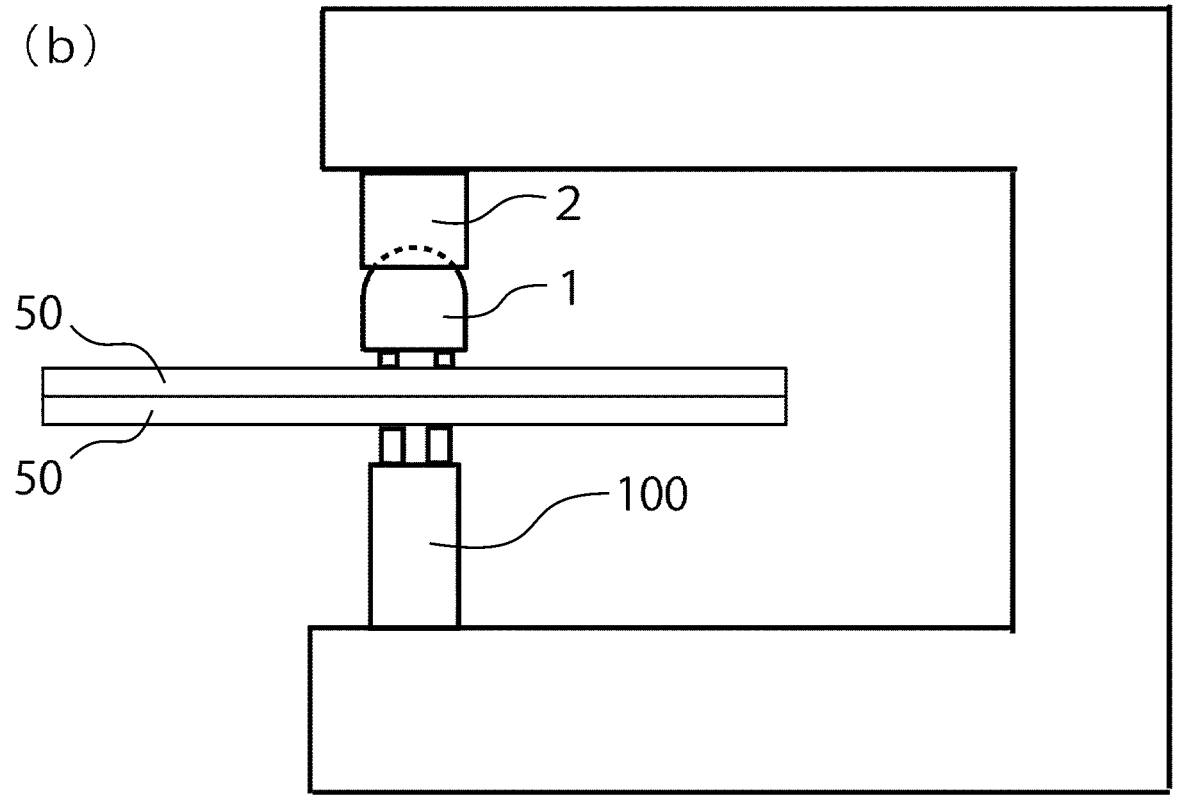

FIGS. 14A and 14B are conceptual views of a spot welding apparatus using electrodes of a first embodiment, while FIGS. 15A and 15B are conceptual views of a spot welding apparatus using electrodes of the second embodiment. As shown in FIG. 14A and FIG. 15A, sometimes the electrode according to the present invention is applied for both of the facing electrodes, while as shown in FIG. 14B and FIG. 15B, sometimes it is applied for just one. Even if the electrode holder itself deforms and the axes of the facing two electrodes cross at a slant, by applying the electrode according to the present invention to one electrode, the two electrodes can suitably contact the steel sheets. As shown in FIGS. 14A and 14B and FIGS. 15A and 15B, by applying the spot welding electrode according to the present invention for at least one of the two facing electrodes, it is possible to obtain a stable nugget even with a donut-shaped electrode.

Spot Welding Method

Figure 16:
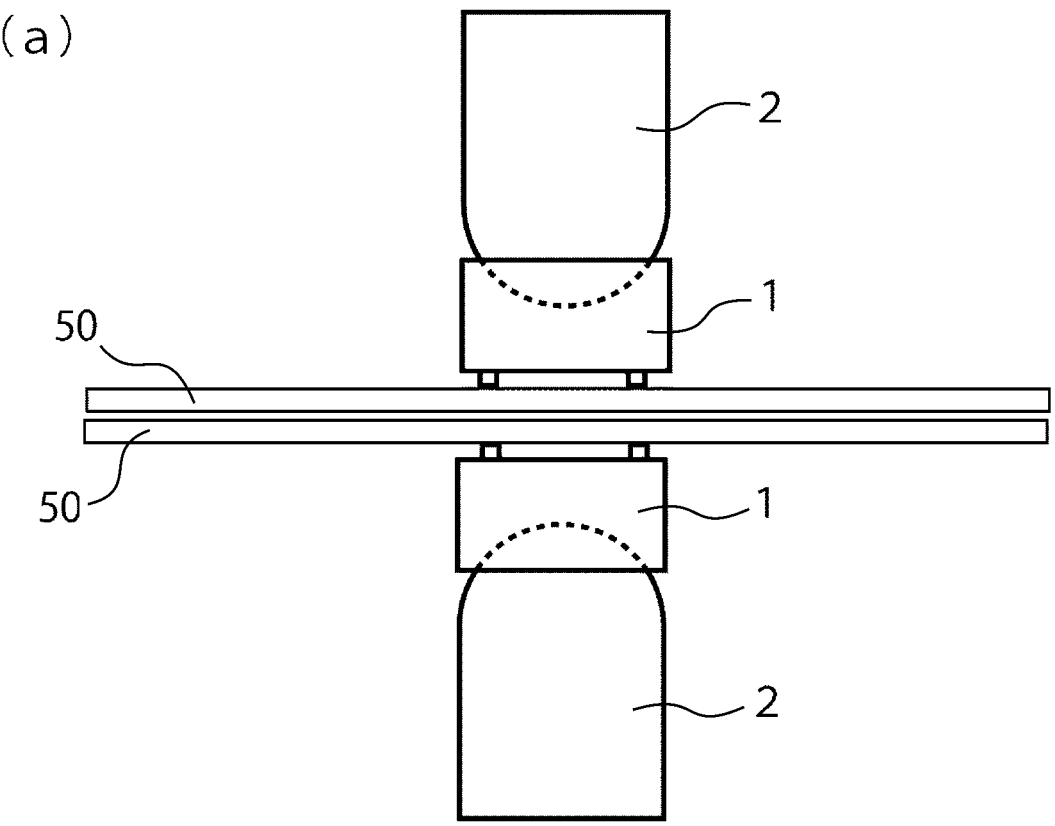
FIGS. 16A and 16B are views for explaining an example of use of the spot welding electrodes according to the present invention.
Figure 16:
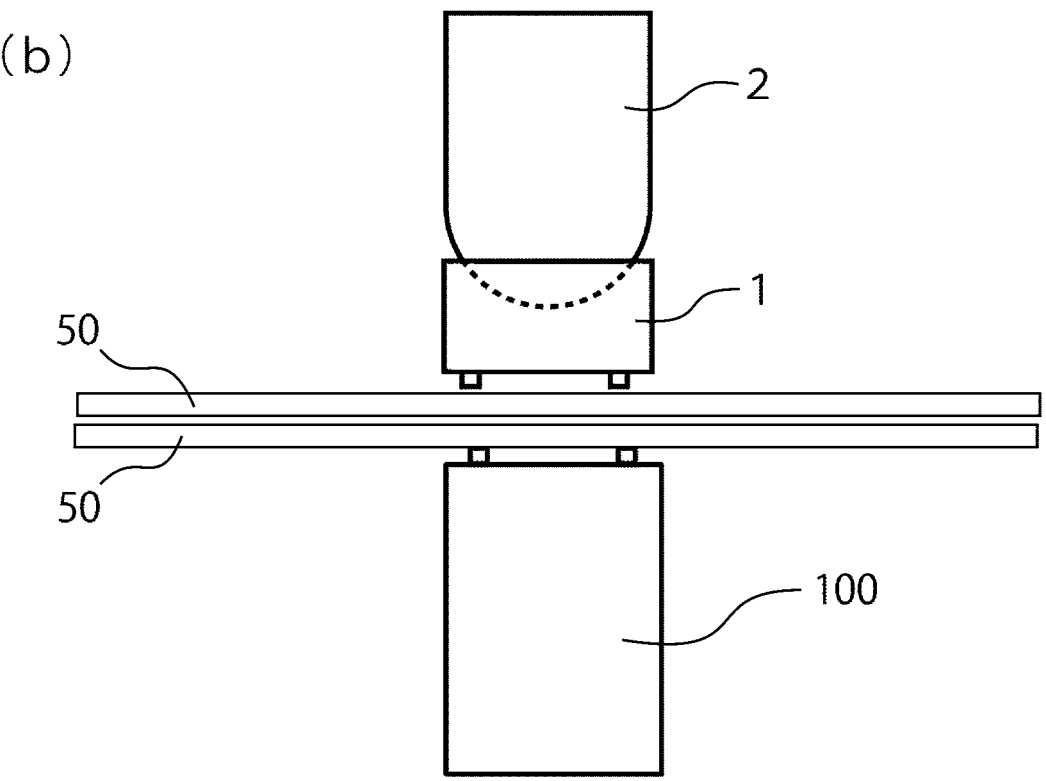
Figure 17:
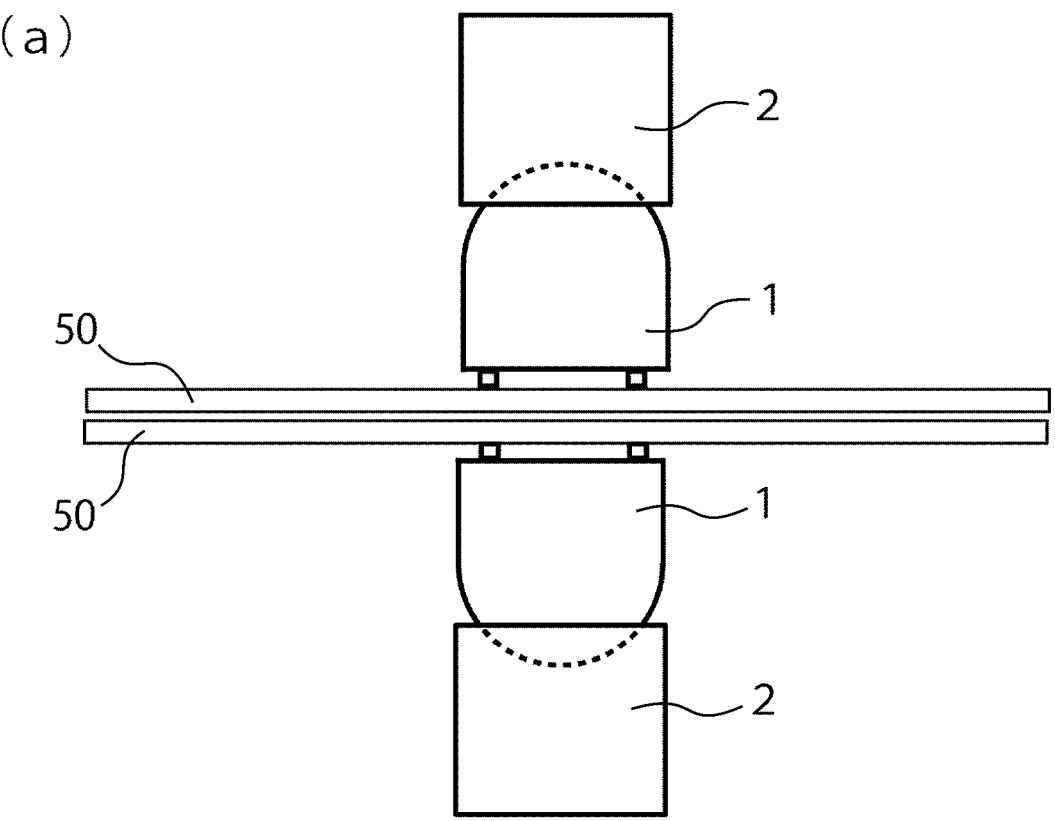
FIGS. 17A and 17B are views for explaining an example of use of the spot welding electrodes according to the present invention.
Figure 17:
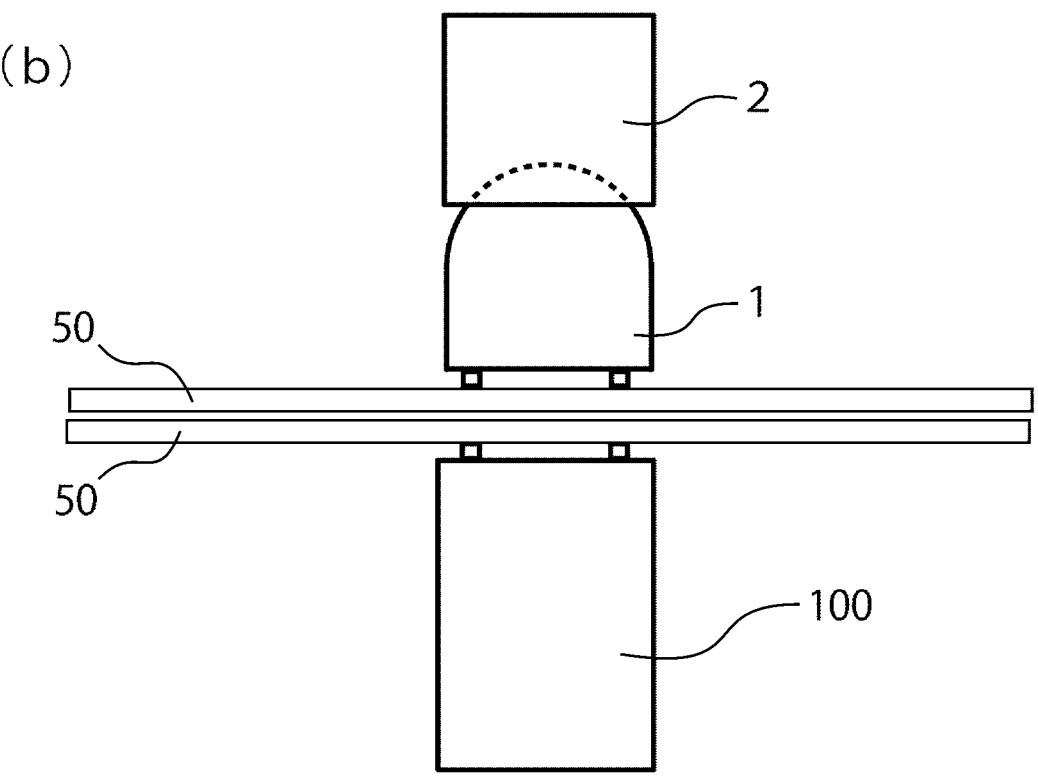
Figure 18:
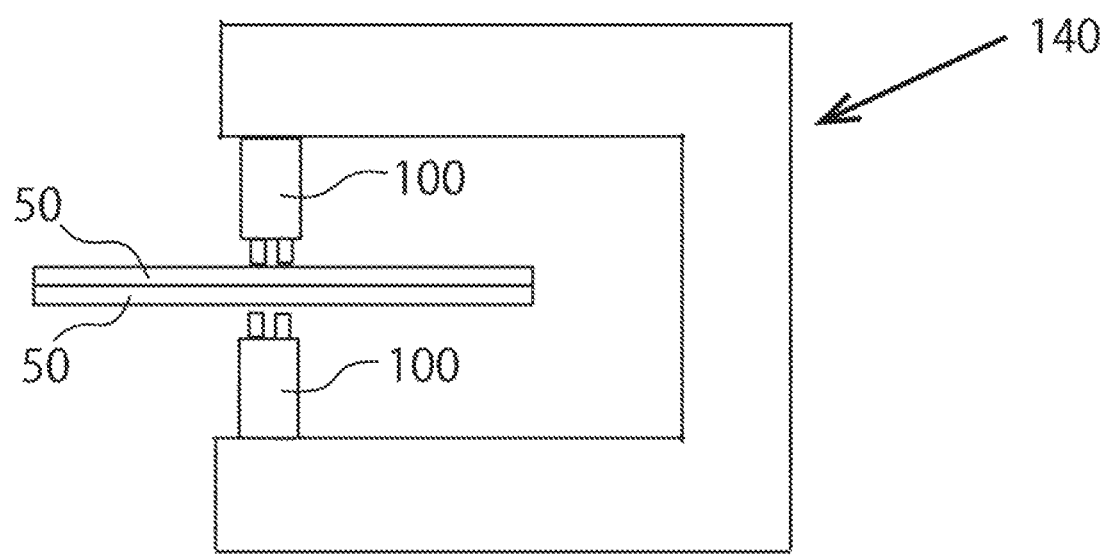
FIG. 18 is a view for explaining the concept of a spot welding apparatus using conventional spot welding electrodes.
Figure 19:
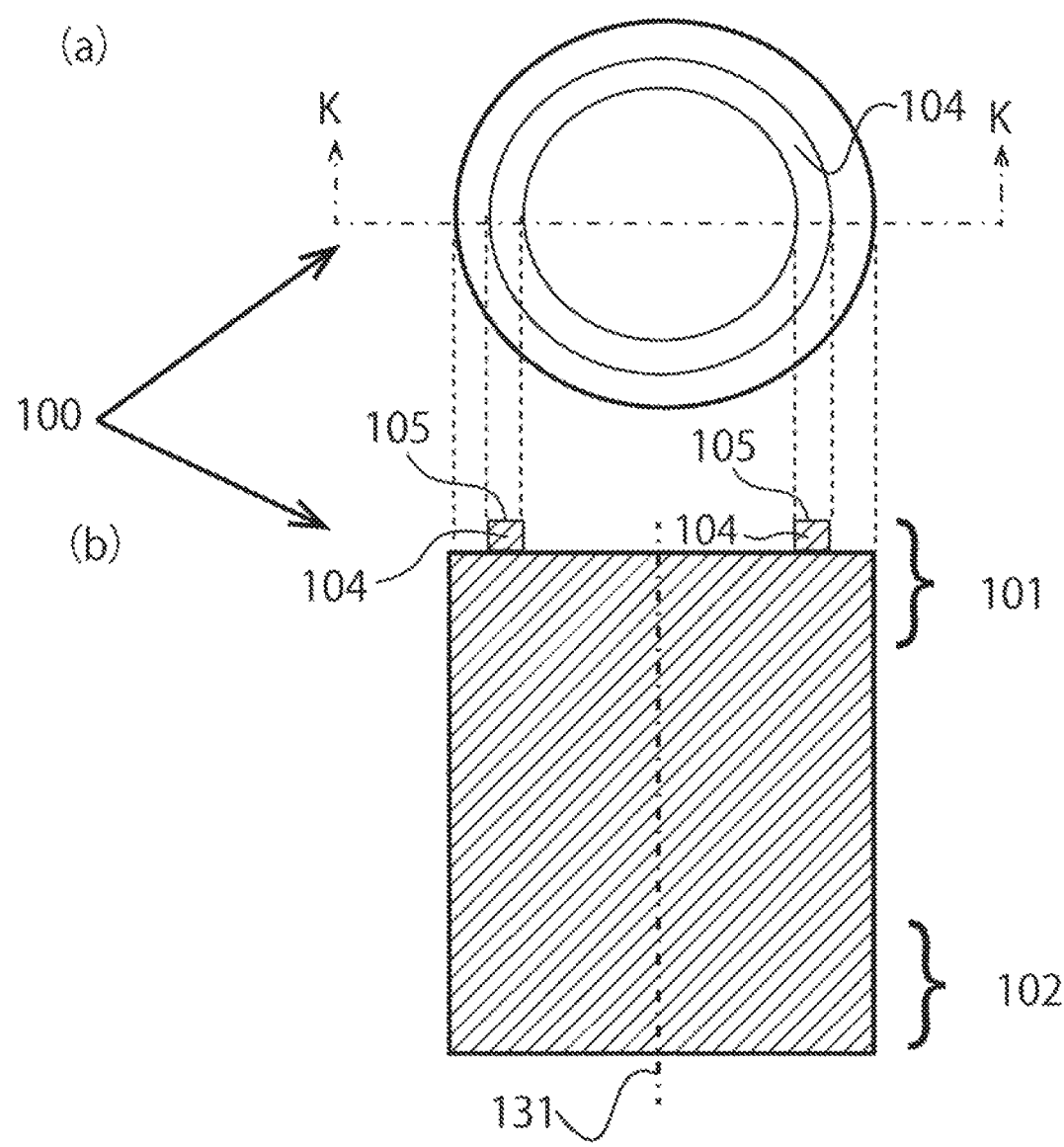
FIGS. 19A and 19B are views for explaining the concept of a conventional spot welding electrode.

FIGS. 16A and 16B are conceptual views of a spot welding method using an electrode of the first embodiment, while FIGS. 17A and 17B are conceptual views using an electrode of the second embodiment. As shown in FIG. 16A and FIG. 17A, sometimes the electrode according to the present invention is applied for both of the facing electrodes, while as shown in FIG. 16B and FIG. 17B, sometimes it is applied for just one. As shown in FIG. 16 and FIG. 17, by using the spot welding electrode according to the present invention for at least one of the two facing electrodes, it is possible to obtain a stable nugget even with a donut-shaped electrode.

EXAMPLES

Spot welding was performed by the conditions shown in Table 1 and Table 2. For comparison, the steel sheet slant angles were changed to 0°, 5°, 10°, and 20° to measure the CTS. The CTS was tested in accordance with JIS Z 3137 (1999).

The "steel sheet slant angle", as shown in FIG. 7, means the angle θ formed by the plane perpendicular to the electrode axis (center axes of facing electrodes) and a steel sheet when using an electrode of the present invention.

The contact-and-conduction part was based on a donut shape (circular ring shape shown in FIGS. 8A-1 to 8B and FIGS. 9A-1 to 9B) made a split circular ring (shape of split circular ring shown in FIGS. 12A-1 to 12B and FIGS. 13A-1 to 13B) or hexagonal ring (hexagonal shape shown in FIGS. 10A-1 to 10B and FIGS. 11A-1 to 11B). No. 1 and No. 2 are comparative examples. In the conventional spot welding electrodes, a point-shaped electrode (disk shaped contact-and-conduction part) was made No. 1, while a donut shape (circular ring shape) electrode was made No. 2.

As invention examples and comparative examples of No. 3 to No. 9, No. 14 to No. 29, No. 34, and No. 35, spot welding electrodes of the present invention shown in FIGS. 8A-1 to 8B with contact-and-conduction surfaces of donut shapes (circular ring shapes) and recessed tails of electrode tips (first embodiment) were used.

Note that, in the invention examples of No. 34 and No. 35, the shape when viewing the contact-and-conduction surface 15 from right above the tip 1 is a closed curve. At the space at the inside of the sealed curve, there is an insulating member. In the case of the invention example of No. 34, mica was attached, while in the case of the invention example of No. 35, silicon nitride was attached.

The steel sheets and welding conditions used for the examples are shown in Table 1. Further, the dimensions of the electrodes used in the examples are shown in Table 2.

The results are shown in Table 3. In the evaluation, the CTS [kN]=7.1 at the time of a steel sheet slant angle 0° in the point-shaped electrode usually used in No. 1 is made the base. The change with respect to this was defined as the "base ratio [%]". Further, in each test electrode, the ratio between the CTS value at the time of a slant angle 0° and the CTS values at the time of the slant angles 5°, 10°, and 20° was made the "CTS ratio (%)". If the CTS ratio is 60% or more, the result was evaluated as passing ("good") while otherwise it was evaluated as failing ("poor").

CASE OF INVENTIVE EXAMPLES

Nos. 4 to 8, 11, 12, 15 to 17, 20 to 24, and 26 to 35 are invention examples. According to Table 3, it was confirmed that if applying the spot electrode of the present invention (recessed shape of tail of electrode tip), even if the steel sheet slant angle is 20° or so, deterioration of the CTS can be prevented.

CASE OF COMPARATIVE EXAMPLES

Nos. 1, 2, 3, 9, 10, 13, 14, 18, 19, and 25 are comparative examples.

According to Table 3, Nos. 14 and 18 are examples where the sliding parts fused together thereby making welding impossible, No. 19 is an example where the contact parts melted thereby making welding impossible, and No. 25 is an example where a nugget could not be formed. Further, it was confirmed that even if not able to be welded, if the slant angle becomes 20° or so, the CTS greatly deteriorates from the base.

Furthermore, these results are graphed in FIG. 20. While explained above, as clear from FIG. 20, when there is no steel sheet slant ($\theta=0$), by making the electrode donut-shaped, the CTS value becomes about 1.8 times that of a conventional point electrode, so the effect of the donut shape is verified. However, along with an increase of the steel sheet slant, the donut-shaped electrode ends up one-sided in contact resulting in point contact, so the CTS value rapidly falls and becomes equal to that of a conventional point type electrode with a slant of about 5°.

As opposed to this, the electrode according to the present invention is not affected much at all by the steel sheet slant at 5° or so. As the steel sheet slant increases, the offset increases during conduction, so the CTS value falls. However, the drop is slight. Even with a steel sheet slant angle of 20° ($\theta=20°$), it only falls about 17%. A CTS value of about 5 times a point electrode or conventional donut-shaped electrode was obtained. Above, the present invention was explained, but the present invention is not limited to the above examples. If satisfying the requirements of the present invention, the effects can be obtained.

TABLE 1

| | |
|---|---|
| Steel sheet strength | 980 MPa class |
| Sheet thickness | 1.2 mm |
| Pressing force | 3 kN |
| Current value | 8 kA |
| Conduction time | 300 ms |

TABLE 2

| | | | Shape of electrode | | | Contact-and-conduction surface 15 | | | | |
|---|---|---|---|---|---|---|---|---|---|---|
| No. | Type | Sliding method | Radius of curvature of head of support/mm | Radius of curvature of head of support/mm | Difference of radius of curvature of recess/% | Form of contact-and-conduction part | Diameter D of smallest surrounding circle/mm | Conduction part width/mm | Area S/mm² | Height of conduction part/mm |
| 1 | Comp. ex. | No sliding | — | — | — | Circle | 8 | — | 50.24 | 0.5 |
| 2 | Comp. ex. | No sliding | — | — | — | Circular ring | 12 | 1 | 34.54 | 0.5 |
| 3 | Comp. ex. | Projecting shape of head of support | 3 | 3.05 | 1.7 | Circular ring | 12 | 1 | 34.54 | 0.5 |
| 4 | Inv. ex. | Projecting shape of head of support | 4 | 4.05 | 1.3 | Circular ring | 12 | 1 | 34.54 | 0.5 |
| 5 | Inv. ex. | Projecting shape of head of support | 8 | 8.05 | 0.6 | Circular ring | 12 | 1 | 34.54 | 0.5 |
| 6 | Inv. ex. | Projecting shape of head of support | 12 | 12.05 | 0.4 | Circular ring | 12 | 1 | 34.54 | 0.5 |
| 7 | Inv. ex. | Projecting shape of head of support | 16 | 16.05 | 0.3 | Circular ring | 12 | 1 | 34.54 | 0.5 |
| 8 | Inv. ex. | Projecting shape of head of support | 20 | 20.05 | 0.2 | Circular ring | 12 | 1 | 34.54 | 0.5 |
| 9 | Comp. ex. | Projecting shape of head of support | 22 | 22.05 | 0.2 | Circular ring | 12 | 1 | 34.54 | 0.5 |
| 10 | Comp. ex. | Projecting shape of head of support | 3.05 | 3 | 0.7 | Circular ring | 12 | 1 | 34.54 | 0.5 |
| 11 | Inv. ex. | Projecting shape of head of support | 4.05 | 4 | 1.3 | Circular ring | 12 | 1 | 34.54 | 0.5 |
| 12 | Inv. ex. | Projecting shape of head of support | 20.05 | 20 | 0.2 | Circular ring | 12 | 1 | 34.54 | 0.5 |
| 13 | Comp. ex. | Projecting shape of head of support | 22.05 | 22 | 0.3 | Circular ring | 12 | 1 | 34.54 | 0.5 |
| 14 | Comp. ex. | Projecting shape of head of support | 8 | 7.2 | −10.0 | Circular ring | 12 | 1 | 34.54 | 0.5 |
| 15 | Inv. ex. | Projecting shape of head of support | 8 | 7.6 | −5.0 | Circular ring | 12 | 1 | 34.54 | 0.5 |
| 16 | Inv. ex. | Projecting shape of head of support | 8 | 8.4 | 5.0 | Circular ring | 12 | 1 | 34.54 | 0.5 |
| 17 | Inv. ex. | Projecting shape of head of support | 8 | 8.8 | 10.0 | Circular ring | 12 | 1 | 34.54 | 0.5 |
| 18 | Comp. ex. | Projecting shape of head of support | 8 | 9 | 12.5 | Circular ring | 12 | 1 | 34.54 | 0.5 |

TABLE 2-continued

Figure 10:
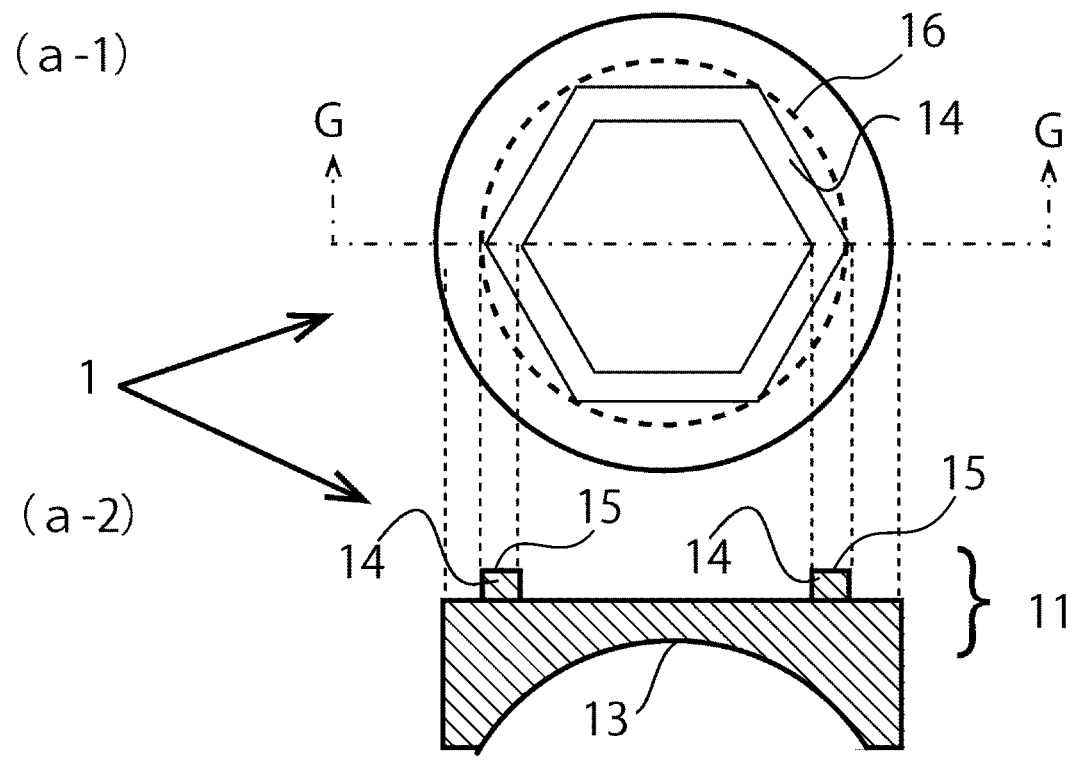
Figure 10:
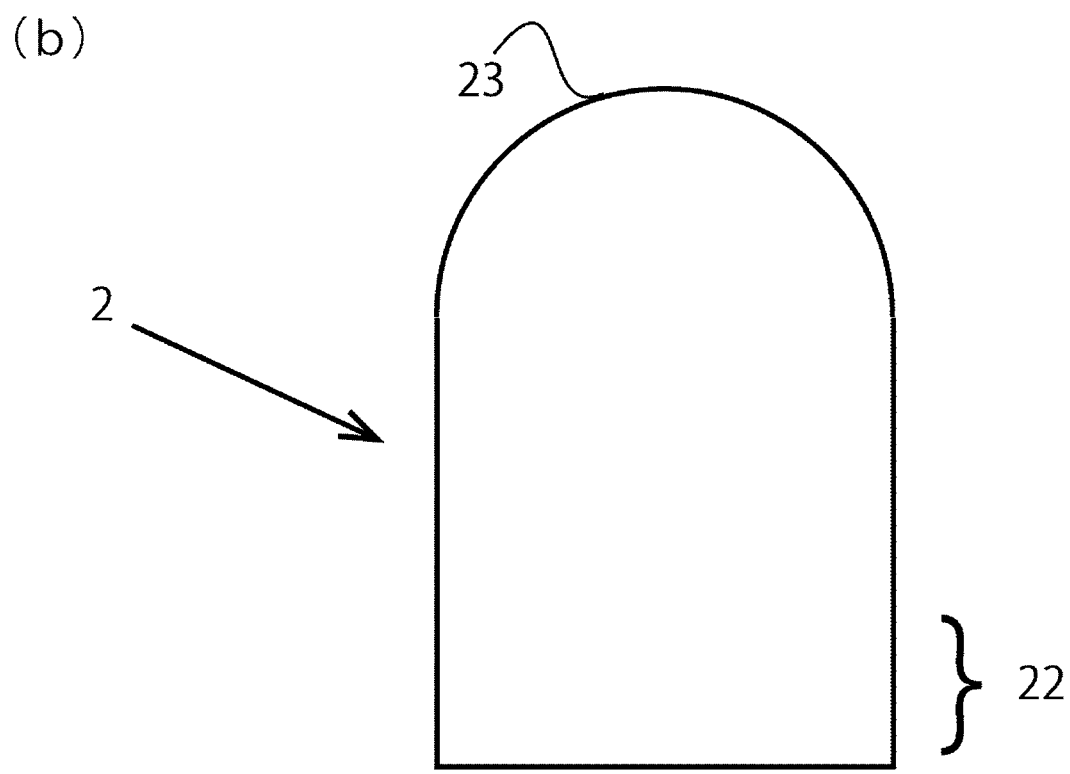
Figure 11:
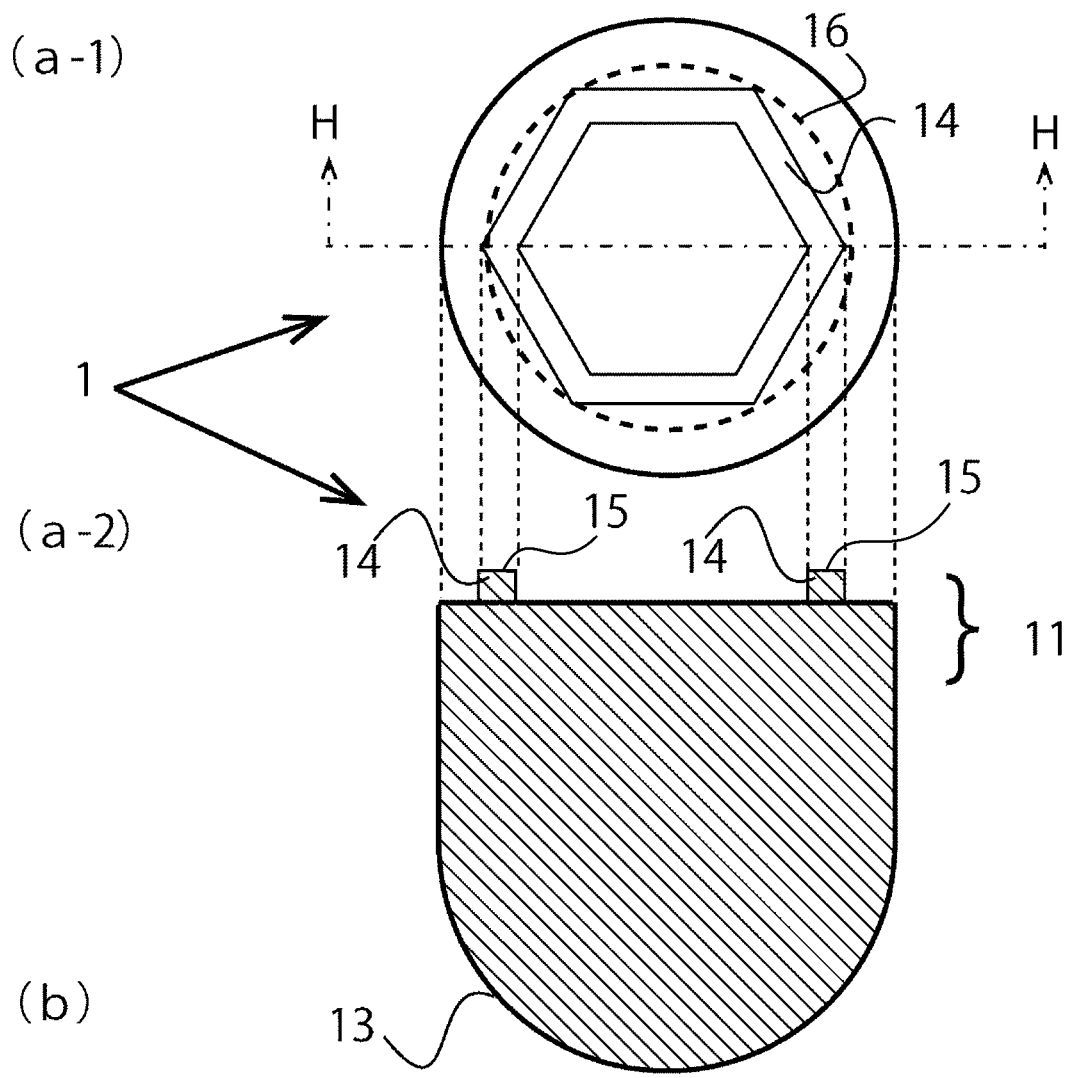
Figure 11:
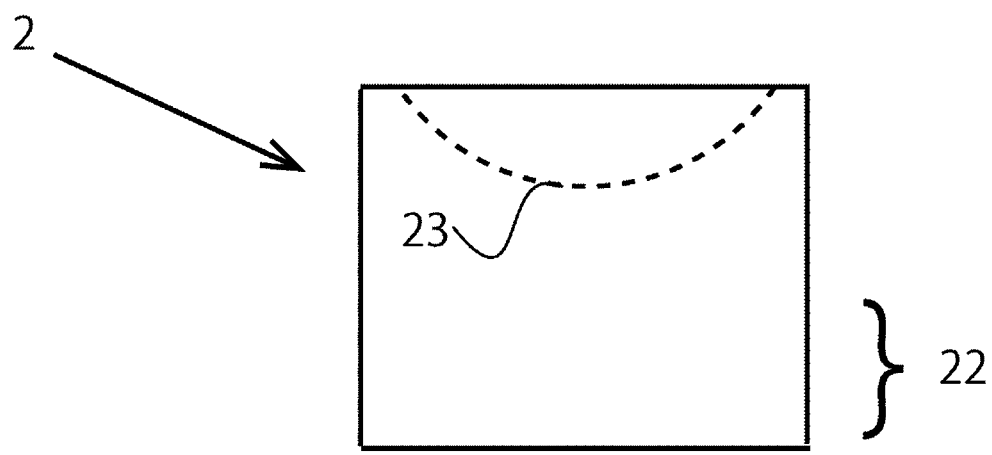
Figure 12:
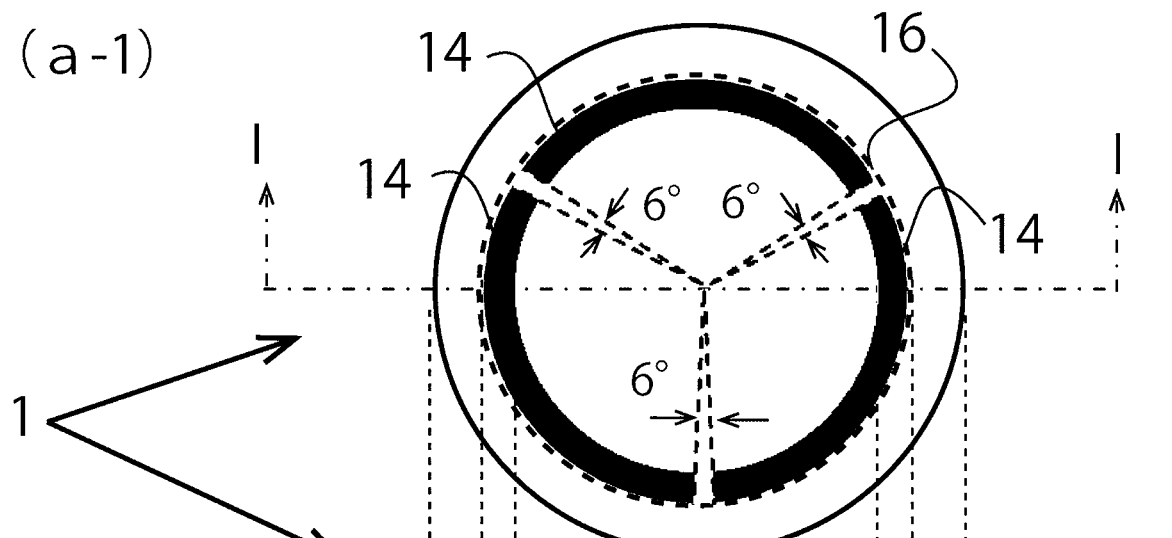
Figure 12:
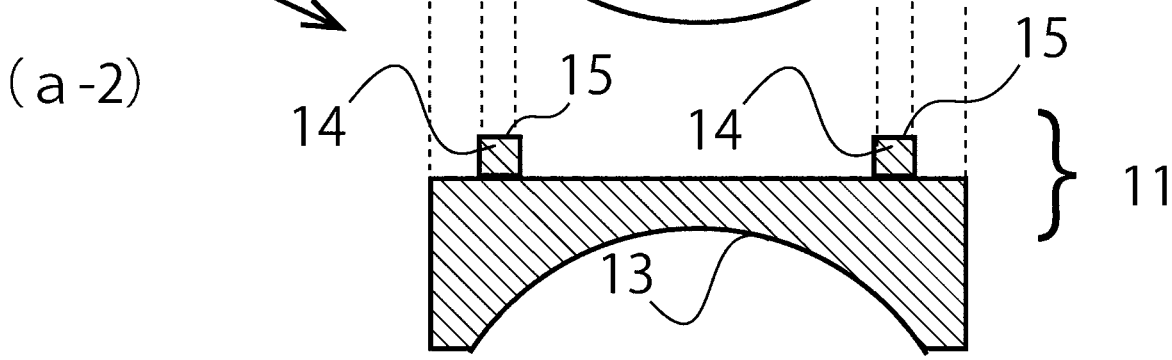
Figure 12:
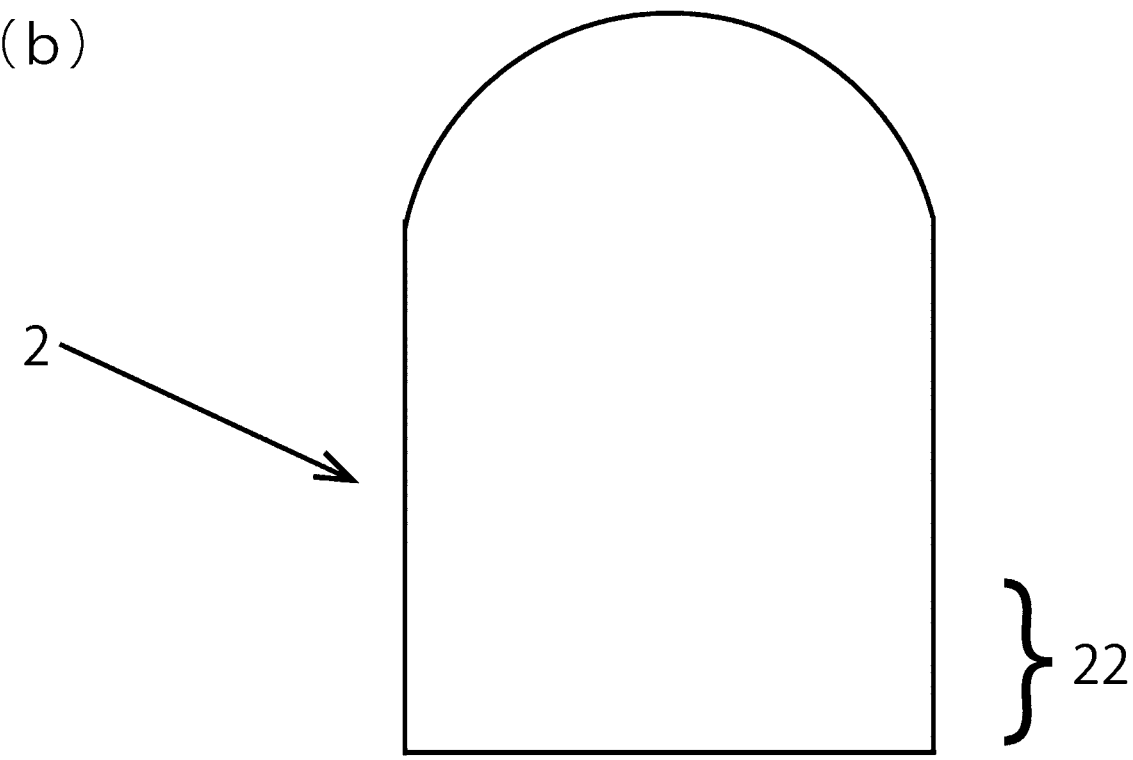
Figure 13:
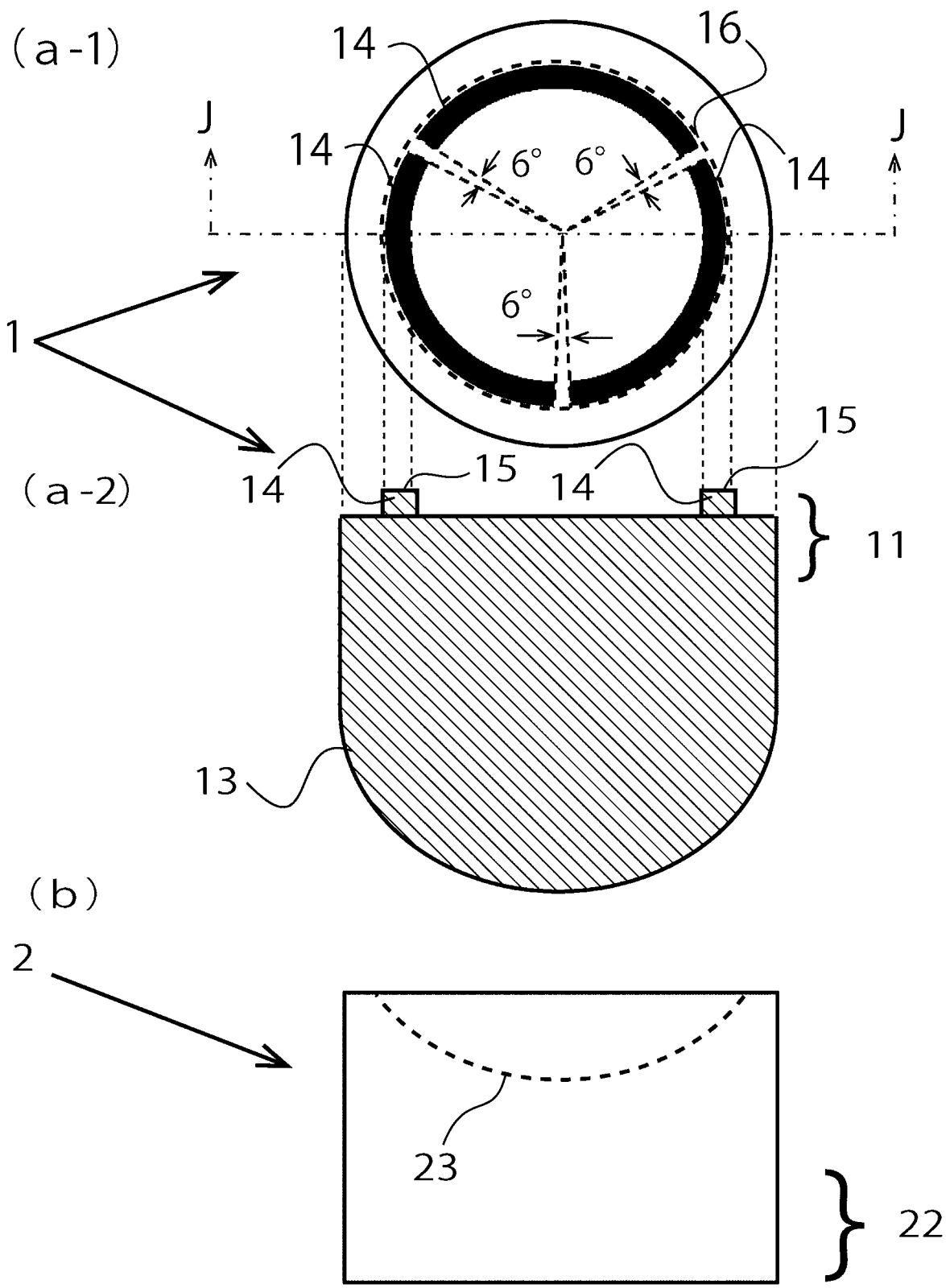

| | | Shape of electrode | | | Contact-and-conduction surface 15 | | | | | |
|---|---|---|---|---|---|---|---|---|---|---|
| No. | Type | Sliding method | Radius of curvature of head of support/mm | Radius of curvature of head of support/mm | Difference of radius of curvature of recess/% | Form of contact-and-conduction part | Diameter D of smallest surrounding circle/mm | Conduction part width/mm | Area $S/mm^2$ | Height of conduction part/mm |
| 19 | Comp. ex. | Projecting shape of head of support | 8 | 8.05 | 0.6 | Circular ring | 12 | 0.3 | 11.02 | 0.5 |
| 20 | Inv. ex. | Projecting shape of head of support | 8 | 8.05 | 0.6 | Circular ring | 12 | 0.4 | 14.57 | 0.5 |
| 21 | Inv. ex. | Projecting shape of head of support | 8 | 8.05 | 0.6 | | 12 | 0.5 | 18.06 | 0.5 |
| 22 | Inv. ex. | Projecting shape of head of support | 8 | 8.05 | 0.6 | | 12 | 1.5 | 49.46 | 0.5 |
| 23 | Inv. ex. | Projecting shape of head of support | 8 | 8.05 | 0.6 | | 12 | 2 | 62.80 | 0.5 |
| 24 | Inv. ex. | Projecting shape of head of support | 8 | 8.05 | 0.6 | | 12 | 2.2 | 67.70 | 0.5 |
| 25 | Comp. ex. | Projecting shape of head of support | 8 | 8.05 | 0.6 | | 12 | 2.4 | 72.35 | 0.5 |
| 26 | Inv. ex. | Projecting shape of head of support | 8 | 8.05 | 0.6 | | 9 | 1 | 25.12 | 0.5 |
| 27 | Inv. ex. | Projecting shape of head of support | 8 | 8.05 | 0.6 | | 13 | 1 | 37.68 | 0.5 |
| 28 | Inv. ex. | Projecting shape of head of support | 8 | 8.05 | 0.6 | | 17 | 1 | 50.24 | 0.5 |
| 29 | Inv. ex. | Projecting shape of head of support | 8 | 8.05 | 0.6 | | 20 | 1 | 59.66 | 0.5 |
| 30 | Inv. ex. | Projecting shape of head of support | 8 | 8.05 | 0.6 | FIG. 10 | 12 | 1 | 32.81 | 0.5 |
| 31 | Inv. ex. | Projecting shape of head of support | 8 | 8.05 | 0.6 | Hexagonal ring | 12 | 1 | 28.58 | 0.5 |
| 32 | Inv. ex. | Projecting shape of head of support | 8 | 8.05 | 0.6 | Circular ring (inside mica) | 12 | 1 | 34.54 | 0.5 |
| 33 | Inv. ex. | Projecting shape of head of support | 8 | 8.05 | 0.6 | Circular ring (inside silicon nitride) | 12 | 1 | 34.54 | 0.5 |

TABLE 3

| | | | Slant angle 0° | | | Slant angle 5° | | | Slant angle 10° | | | Slant angle 20° | | | |
|---|---|---|---|---|---|---|---|---|---|---|---|---|---|---|---|---|
| No. | Type | Weld-ability | CTS (kN) | Base ratio (%) | CTS (kN) | Base ratio (%) | CTS ratio with slant angle 0° (%) | CTS eval. | CTS (kN) | Base ratio (%) | CTS ratio with slant angle 0° (%) | CTS eval. | CTS (kN) | Base ratio (%) | CTS ratio with slant angle 0° (%) | CTS eval. | Judg-ment |
| 1 | Comp. ex. | | 7.1 | Base | 5.2 | −26.8 | 73.2 | Good | 3.6 | −49.3 | 50.7 | Poor | 1.8 | −74.6 | 25.4 | Poor | Poor |
| 2 | Comp. ex. | | 12.9 | 82.7 | 4.8 | −32.4 | 37.2 | Poor | 2.4 | −66.2 | 18.6 | Poor | 1.6 | −77.5 | 12.4 | Poor | Poor |
| 3 | Comp. ex. | | 12.8 | 77.5 | 10.4 | 46.5 | 82.5 | Good | 5.4 | −23.9 | 42.9 | Poor | 3.6 | −49.3 | 28.6 | Poor | Poor |
| 4 | Inv. ex. | | 11.6 | 63.4 | 12 | 69.0 | 103.4 | Good | 10.8 | 52.1 | 93.1 | Good | 10.2 | 43.7 | 87.9 | Good | Good |
| 5 | Inv. ex. | | 12.3 | 73.2 | 12.5 | 76.1 | 101.6 | Good | 11.2 | 57.7 | 91.1 | Good | 9.6 | 35.2 | 78.0 | Good | Good |
| 6 | Inv. ex. | | 12.5 | 76.1 | 12.6 | 77.5 | 100.8 | Good | 11.8 | 66.2 | 94.4 | Good | 10.7 | 50.7 | 85.6 | Good | Good |
| 7 | Inv. ex. | | 12.2 | 71.8 | 12 | 69.0 | 98.4 | Good | 11.6 | 63.4 | 95.1 | Good | 10.5 | 47.9 | 86.1 | Good | Good |
| 8 | Inv. ex. | | 10.8 | 52.1 | 11.4 | 60.6 | 105.6 | Good | 9.8 | 38.0 | 90.7 | Good | 7.6 | 7.0 | 70.4 | Good | Good |
| 9 | Comp. ex. | | 11.5 | 62.0 | 7.5 | 5.6 | 65.2 | Good | 5.8 | −18.3 | 50.4 | Poor | 3.2 | −54.9 | 27.8 | Poor | Poor |
| 10 | Comp. ex. | | 12.4 | 74.6 | 5.7 | −19.7 | 46.0 | Poor | 2.2 | −69.0 | 17.7 | Poor | 1.4 | −80.3 | 11.3 | Poor | Poor |
| 11 | Inv. ex. | | 12.2 | 71.8 | 10.8 | 52.1 | 88.5 | Good | 11.4 | 60.6 | 93.4 | Good | 10.4 | 46.5 | 85.2 | Good | Good |
| 12 | Inv. ex. | | 11.4 | 60.6 | 11.8 | 66.2 | 103.5 | Good | 10.8 | 52.1 | 94.7 | Good | 11.2 | 57.7 | 98.2 | Good | Good |
| 13 | Comp. ex. | | 12 | 69.0 | 9.4 | 32.4 | 78.3 | Good | 4.8 | −32.4 | 40.0 | Poor | 2.9 | −59.2 | 24.2 | Poor | Poor |
| 14 | Comp. ex. | Poor (sliding parts fused) | 11.3 | 59.2 | — | — | — | — | — | — | — | — | — | — | — | — | Poor |
| 15 | Inv. ex. | | 11.9 | 67.6 | 10.8 | 52.1 | 90.8 | Good | 11.3 | 59.2 | 95.0 | Good | 9.2 | 29.6 | 77.3 | Good | Good |
| 16 | Inv. ex. | | 12.4 | 74.6 | 11.4 | 60.6 | 91.9 | Good | 9.7 | 36.6 | 78.2 | Good | 10.1 | 42.3 | 81.5 | Good | Good |
| 17 | Inv. ex. | | 11.6 | 63.4 | 12.1 | 70.4 | 104.3 | Good | 10.3 | 45.1 | 88.8 | Good | 9.4 | 32.4 | 81.0 | Good | Good |
| 18 | Comp. ex. | Poor (sliding parts fused) | 12.6 | 77.5 | — | — | — | — | — | — | — | — | — | — | — | — | Poor |

TABLE 3-continued

| | | | Slant angle 0° | | Slant angle 5° | | | | Slant angle 10° | | | | Slant angle 20° | | | | |
| | | | | | CTS ratio | | | | CTS ratio | | | | CTS ratio | | | | |
| | | | | Base | | Base | with slant | | | Base | with slant | | | Base | with slant | | |
| | | Weld- | CTS | ratio | CTS | ratio | angle 0° | CTS | CTS | ratio | angle 0° | CTS | CTS | ratio | angle 0° | CTS | Judg- |
| No. | Type | ability | (kN) | (%) | (kN) | (%) | (%) | eval. | (kN) | (%) | (%) | eval. | (kN) | (%) | (%) | eval. | ment |
|---|---|---|---|---|---|---|---|---|---|---|---|---|---|---|---|---|---|
| 19 | Comp. ex. | Poor (sliding parts fused) | — | — | — | — | — | — | — | — | — | — | — | — | — | — | Poor |
| 20 | Inv. ex. | | 8.7 | 22.5 | 9.1 | 28.2 | 104.6 | Good | 7.9 | 11.3 | 90.8 | Good | 8.2 | 15.5 | 94.3 | Poor | Poor |
| 21 | Inv. ex. | | 9.5 | 33.8 | 10.3 | 45.1 | 108.4 | Good | 9.9 | 39.4 | 104.2 | Good | 10.5 | 47.9 | 110.5 | Poor | Poor |
| 21 | Inv. ex. | | 9.5 | 33.8 | 10.3 | 45.1 | 108.4 | Good | 9.9 | 39.4 | 104.2 | Good | 10.5 | 47.9 | 110.5 | Poor | Poor |
| 22 | Inv. ex | | 12.7 | 78.9 | 12.5 | 76.1 | 98.4 | Good | 11.4 | 60.6 | 89.8 | Good | 11.8 | 66.2 | 92.9 | Good | Good |
| 23 | Inv. ex | | 11.1 | 56.3 | 11.3 | 59.2 | 101.8 | Good | 10.1 | 42.3 | 91.0 | Good | 9.4 | 32.4 | 84.7 | Good | Good |
| 24 | Inv. ex | | 9.5 | 33.8 | 9.2 | 29.6 | 96.8 | Good | 9.8 | 38.0 | 103.2 | Good | 8.6 | 21.1 | 90.5 | Good | Good |
| 25 | Comp. ex. | Poor (nugget not formed) | — | — | — | — | — | — | — | — | — | — | — | — | — | — | Poor |
| 26 | Inv. ex | | 9.2 | 29.6 | 8.8 | 23.9 | 95.7 | Good | 9.4 | 32.4 | 102.2 | Good | 8.2 | 15.5 | 89.1 | Good | Good |
| 27 | Inv. ex | | 12.4 | 74.6 | 13.1 | 84.5 | 105.6 | Good | 12.6 | 77.5 | 101.6 | Good | 10.1 | 42.3 | 81.5 | Good | Good |
| 28 | Inv. ex | | 12.6 | 77.5 | 11.1 | 56.3 | 88.1 | Good | 13.8 | 94.4 | 109.5 | Good | 12.7 | 78.9 | 100.8 | Good | Good |
| 29 | Inv. ex | | 14.4 | 102.8 | 13.9 | 95.8 | 96.5 | Good | 14.8 | 108.5 | 102.8 | Good | 9.5 | 33.8 | 66.0 | Good | Good |
| 30 | Inv. ex | | 11.5 | 62.0 | 10.2 | 43.7 | 88.7 | Good | 10.9 | 53.5 | 94.8 | Good | 9.4 | 32.4 | 81.7 | Good | Good |
| 31 | Inv. ex | | 10.4 | 46.5 | 10.9 | 53.5 | 104.8 | Good | 9.5 | 33.8 | 91.3 | Good | 8.5 | 19.7 | 81.7 | Good | Good |
| 32 | Inv. ex | | 12.3 | 73.2 | 11.4 | 60.6 | 92.7 | Good | 11.7 | 64.8 | 95.1 | Good | 10.5 | 47.9 | 85.4 | Good | Good |
| 33 | Inv. ex | | 12.6 | 77.5 | 12.1 | 70.4 | 96.0 | Good | 12.4 | 74.6 | 98.4 | Good | 11.6 | 63.4 | 92.1 | Good | Good |

INDUSTRIAL APPLICABILITY

The present invention can be utilized for a spot welding electrode used in the past. For this reason, the effect can be enjoyed by application to a conventional apparatus without requiring massive capital investment.

REFERENCE SIGNS LIST 1. electrode tip
2. electrode support
11. head of electrode tip
13. tail of electrode tip
14. contact-and-conduction part
15. contact-and-conduction surface
16. smallest surrounding circle
19. spring hook for holding electrode tip
22. tail of electrode support
23. head of electrode support
29. spring hook for holding support
31. electrode axis
32. insulating member
39. holding spring
50. steel sheet (welded member)
100. conventional spot welding electrode
101. head of conventional spot welding electrode
102. tail of conventional spot welding electrode
104. contact-and-conduction part of conventional spot welding electrode
105. contact-and-conduction surface of conventional spot welding electrode
131. center axis of conventional spot welding electrode
140. conventional spot welding apparatus

The invention claimed is:

1. A spot welding electrode, having comprising:
   an electrode tip having a donut shape contact-and-conduction part; and
   an electrode support supporting the electrode tip,
   wherein said electrode tip contacts said electrode support to be able to swing,
   wherein said donut shape contact-and-conduction part has an insulating member placed at its center, and
   wherein said electrode tip and said electrode support are supported together by a spring enabling the electrode tip to be pushed against the electrode support.

2. The spot welding electrode according to claim 1, wherein a tail of said electrode tip and a head of said electrode support, forming contact parts of said electrode tip and said electrode support, are spherical crown shapes.

3. The spot welding electrode according to claim 2, wherein radii of curvature of said tail of said electrode tip and said head of said electrode support are 4 mm to 20 mm and a radius of curvature of said tail of said electrode tip is −5% to +10% of a radius of curvature of said head of the electrode support.

4. The spot welding electrode according to claim 2, wherein in said contact-and-conduction part, an area of a contact-and-conduction surface contacting and conductive with a welded member is 12 mm$^2$ to 70 mm$^2$ and a diameter D of a smallest circle surrounding said contact-and-conduction surface is 8 mm to 20 mm.

5. The spot welding electrode according to claim 2, wherein in said contact-and-conduction part, a contact-and-conduction surface contacting and conductive with a welded member is a closed curve of a circular ring, elliptical ring, or n-sided polygon (n≥3) with a 0.3 mm to 2.5 mm width.

6. The spot welding electrode according to claim 3, wherein in said contact-and-conduction part, an area of a contact-and-conduction surface contacting and conductive with a welded member is 12 mm$^2$ to 70 mm$^2$ and a diameter D of a smallest circle surrounding said contact-and-conduction surface is 8 mm to 20 mm.

7. The spot welding electrode according to claim 3, wherein in said contact-and-conduction part, a contact-andconduction surface contacting and conductive with a welded member is a closed curve of a circular ring, elliptical ring, or n-sided polygon (n≥3) with a 0.3 mm to 2.5 mm width.

8. The spot welding electrode according to claim 1, wherein in said contact-and-conduction part, an area of a contact-and-conduction surface contacting and conductive with a welded member is 12 mm$^2$ to 70 mm$^2$ and a diameter D of a smallest circle surrounding said contact-and-conduction surface is 8 mm to 20 mm.

9. The spot welding electrode according to claim 8, wherein in said contact-and-conduction part, a contact-and-conduction surface contacting and conductive with a welded member is a closed curve of a circular ring, elliptical ring, or n-sided polygon (n≥3) with a 0.3 mm to 2.5 mm width.

10. The spot welding electrode according to claim 1, wherein in said contact-and-conduction part, a contact-and-conduction surface contacting and conductive with a welded member is a closed curve of a circular ring, elliptical ring, or n-sided polygon (n≥3) with a 0.3 mm to 2.5 mm width.

11. The spot welding electrode according to claim 1, wherein metal used for said electrode tip and said electrode support is copper or a copper alloy.

12. A spot welding apparatus for spot welding at least two steel sheets, the spot welding apparatus comprising at least one spot welding electrode according to claim 1.

13. A spot welding method for spot welding at least two steel sheets, the spot welding method comprising using at least one spot welding electrode according to claim 1.

* * * * *